(12) United States Patent
Aykin

(10) Patent No.: US 7,725,339 B1
(45) Date of Patent: May 25, 2010

(54) CONTACT CENTER SCHEDULING USING INTEGER PROGRAMMING

(75) Inventor: Turgut Aykin, Atlantic Highlands, NJ (US)

(73) Assignee: AC2 Solutions, Inc., Hazlet, NJ (US)

( * ) Notice: Subject to any disclaimer, the term of this patent is extended or adjusted under 35 U.S.C. 154(b) by 1892 days.

(21) Appl. No.: 10/614,483

(22) Filed: Jul. 7, 2003

(51) Int. Cl.
*G06F 17/30* (2006.01)

(52) U.S. Cl. ............................................. 705/7; 705/10

(58) Field of Classification Search .................. None
See application file for complete search history.

(56) References Cited

U.S. PATENT DOCUMENTS

| | | | | |
|---|---|---|---|---|
| 5,216,593 | A * | 6/1993 | Dietrich et al. | 345/467 |
| 6,622,134 | B1 * | 9/2003 | Sorkin | 706/20 |
| 6,856,680 | B2 * | 2/2005 | Mengshoel et al. | 379/265.06 |
| 7,249,047 | B2 * | 7/2007 | Arguello et al. | 705/9 |
| 2004/0054564 | A1 * | 3/2004 | Fonseca et al. | 705/7 |
| 2006/0112049 | A1 * | 5/2006 | Mehrotra et al. | 706/46 |

OTHER PUBLICATIONS

Editors (2003). A Journey Renewed. Call Center magazine. Jan. 2003. 16(1): 12-14.*
Mabert VA and Watts CA (1982). A Simulation Analysis of Tour—Shift Construction Procedures. May 1982. 28(5): 520-532.*
Thompson GM (1995). A Simulated—Annealing Heuristic for Shift Scheduling Using Non-Continuously Available Employees. Computers Ops. Res. 23(3): 275-288.*
Segal M (1974). The Operator-Scheduling Problem: A Network-Flow Approach. Operations Research. Jul.-Aug. 1974. 22(4): 808-823.*
Narasimhan R (1995). An algorithm for single shift scheduling of hierarchical workforce. European Journal of Operational Research. 96: 113-121.*
Altman E, Gaujal and Hordijk A (2000). Multimodularity, Convexity, and Optimization Properties. Mathematics of Operations Research. 25(2): 324-347.*
Henderson W and Berry W (1976). Heuristic Methods for Telephone Operator Shift Scheduling: An Experimental Analysis. Management Science. 22(12): 1372-1380.*
Koole G and Van Der Sluis E (2002). Optimal Shift Scheduling with a Global Service Level Constraint. IIE Transactions. 35: 1049-1055.*
Brusco MJ and Johns TR (1996). A Sequential Integer Programming Method for Discontinuous Labor Tour Scheduling. European Journal of Operational Research. 95: 537-548.*

(Continued)

*Primary Examiner*—Romain Jeanty
*Assistant Examiner*—Brett Feeney

(57) ABSTRACT

The present invention relates to a method for workforce scheduling in which workload and workload types vary during scheduling period. The method acquires agent and skill requirements for all periods and contact types; acquires the contact center information including agent skill groups, agent work groups, tour and shift scheduling rules, agent availability, objective criterion to be optimized and its parameters; develops a Mixed Integer Linear Programming (MILP) model for the scheduling environment; applied an optimization algorithm that uses the Branch and Bound algorithm with a Rounding Algorithm to improve performance; and locates a globally optimal or near optimal workforce schedule in total cost or paid time or agent satisfaction. Detailed schedules may be developed by assigning daily shifts to work patterns, and breaks scheduled to daily shifts.

7 Claims, 7 Drawing Sheets

OTHER PUBLICATIONS

Dantzig GB (1954). A Comment of Eddie's Traffic Delays at Toll Booths. Ibid. Jun. 21, 1954. 339-341.*

Gaballa A and Pearce W (1979). Telephone Sales Manpower Planning at Qantas. The Institute of Management Sciences 1-5.*

Aykin T (1996). Optimal Shift Scheduling with Multiple Break Windows. Management Science. 42(4): 591-602.*

Aykin T (1998). A comparative evaluation of modeling approaches to the labor shift scheduling problem. European journal of Operation Research 125: 381-397.*

Aykin T (1998). A composite branch and cut algorithm for optimal shift scheduling with multiple breaks and break windows. Operations Research Society. 49: 603-615.*

Bechtold SE and Jacobs LW (1990). The Institute of Management Sciences. 1339-1351.*

Baily J (1985). Integrated Days Off and Shift Personnel Scheduling. Comput. and Indus. Engng 9(4): 395-404.*

Jarrah AI, Bard FJ and DeSilva AH (1994). Solving Large-Scale Tour Scheduling Problems. Management Science. 40(9): 1124-1144.*

* cited by examiner

FIG. 3

| Number of Days-off | Number of Consecutive Days-off | 1 | 2 | 3 | 4 | 5 | 6 | 7 |
|---|---|---|---|---|---|---|---|---|
| 0 | 0 | 1 | 1 | 1 | 1 | 1 | 1 | 1 |
| 1 | 1 | 0 | 1 | 1 | 1 | 1 | 1 | 1 |
|   | 1 | 1 | 0 | 1 | 1 | 1 | 1 | 1 |
|   | 1 | 1 | 1 | 0 | 1 | 1 | 1 | 1 |
|   | 1 | 1 | 1 | 1 | 0 | 1 | 1 | 1 |
|   | 1 | 1 | 1 | 1 | 1 | 0 | 1 | 1 |
|   | 1 | 1 | 1 | 1 | 1 | 1 | 0 | 1 |
|   | 1 | 1 | 1 | 1 | 1 | 1 | 1 | 0 |
| 2 | 2 | 0 | 0 | 1 | 1 | 1 | 1 | 1 |
|   | 2 | 1 | 0 | 0 | 1 | 1 | 1 | 1 |
|   | 2 | 1 | 1 | 0 | 0 | 1 | 1 | 1 |
|   | 2 | 1 | 1 | 1 | 0 | 0 | 1 | 1 |
|   | 2 | 1 | 1 | 1 | 1 | 0 | 0 | 1 |
|   | 2 | 1 | 1 | 1 | 1 | 1 | 0 | 0 |
|   | 1 | 0 | 1 | 0 | 1 | 1 | 1 | 1 |
|   | 1 | 0 | 1 | 1 | 0 | 1 | 1 | 1 |
|   | 1 | 0 | 1 | 1 | 1 | 0 | 1 | 1 |
|   | 1 | 0 | 1 | 1 | 1 | 1 | 0 | 1 |
|   | 1 | 0 | 1 | 1 | 1 | 1 | 1 | 0 |
|   | 1 | 1 | 0 | 1 | 0 | 1 | 1 | 1 |
|   | 1 | 1 | 0 | 1 | 1 | 0 | 1 | 1 |
|   | 1 | 1 | 0 | 1 | 1 | 1 | 0 | 1 |
|   | 1 | 1 | 0 | 1 | 1 | 1 | 1 | 0 |
|   | 1 | 1 | 1 | 0 | 1 | 0 | 1 | 1 |
|   | 1 | 1 | 1 | 0 | 1 | 1 | 0 | 1 |
|   | 1 | 1 | 1 | 0 | 1 | 1 | 1 | 0 |
|   | 1 | 1 | 1 | 1 | 0 | 1 | 0 | 1 |
|   | 1 | 1 | 1 | 1 | 0 | 1 | 1 | 0 |
|   | 1 | 1 | 1 | 1 | 1 | 0 | 1 | 0 |
| 3 | 3 | 0 | 0 | 0 | 1 | 1 | 1 | 1 |
|   | 3 | 1 | 0 | 0 | 0 | 1 | 1 | 1 |
|   | 3 | 1 | 1 | 0 | 0 | 0 | 1 | 1 |
|   | 3 | 1 | 1 | 1 | 0 | 0 | 0 | 1 |
|   | 3 | 1 | 1 | 1 | 1 | 0 | 0 | 0 |
|   | 2 | 0 | 0 | 1 | 0 | 1 | 1 | 1 |
|   | 2 | 0 | 0 | 1 | 1 | 0 | 1 | 1 |
|   | 2 | 0 | 0 | 1 | 1 | 1 | 0 | 1 |
|   | 2 | 0 | 0 | 1 | 1 | 1 | 1 | 0 |
|   | 2 | 1 | 0 | 0 | 1 | 0 | 1 | 1 |
|   | 2 | 1 | 0 | 0 | 1 | 1 | 0 | 1 |
|   | 2 | 1 | 0 | 0 | 1 | 1 | 1 | 0 |
|   | 2 | 1 | 1 | 0 | 0 | 1 | 0 | 1 |
|   | 2 | 1 | 1 | 0 | 0 | 1 | 1 | 0 |
|   | 2 | 1 | 1 | 1 | 0 | 0 | 1 | 0 |
|   | 2 | 0 | 1 | 0 | 0 | 1 | 1 | 1 |
|   | 2 | 0 | 1 | 1 | 0 | 0 | 1 | 1 |
|   | 2 | 0 | 1 | 1 | 1 | 0 | 0 | 1 |
|   | 2 | 0 | 1 | 1 | 1 | 1 | 0 | 0 |
|   | 2 | 1 | 0 | 1 | 0 | 0 | 1 | 1 |
|   | 2 | 1 | 0 | 1 | 1 | 0 | 0 | 1 |
|   | 2 | 1 | 0 | 1 | 1 | 1 | 0 | 0 |
|   | 2 | 1 | 1 | 0 | 1 | 0 | 0 | 1 |
|   | 2 | 1 | 1 | 0 | 1 | 1 | 0 | 0 |
|   | 2 | 1 | 1 | 1 | 0 | 1 | 0 | 0 |
|   | 1 | 0 | 1 | 0 | 1 | 0 | 1 | 1 |
|   | 1 | 0 | 1 | 0 | 1 | 1 | 0 | 1 |
|   | 1 | 0 | 1 | 0 | 1 | 1 | 1 | 0 |
|   | 1 | 0 | 1 | 1 | 0 | 1 | 0 | 1 |
|   | 1 | 0 | 1 | 1 | 0 | 1 | 1 | 0 |
|   | 1 | 0 | 1 | 1 | 1 | 0 | 1 | 0 |
|   | 1 | 1 | 0 | 1 | 0 | 1 | 0 | 1 |
|   | 1 | 1 | 0 | 1 | 0 | 1 | 1 | 0 |
|   | 1 | 1 | 0 | 1 | 1 | 0 | 1 | 0 |
|   | 1 | 1 | 1 | 0 | 1 | 0 | 1 | 0 |
| 4 | 4 | 0 | 0 | 0 | 0 | 1 | 1 | 1 |
|   | 4 | 1 | 0 | 0 | 0 | 0 | 1 | 1 |
|   | 4 | 1 | 1 | 0 | 0 | 0 | 0 | 1 |
|   | 4 | 1 | 1 | 1 | 0 | 0 | 0 | 0 |
|   | 4 | 0 | 1 | 1 | 1 | 0 | 0 | 0 |
|   | 4 | 0 | 0 | 1 | 1 | 1 | 0 | 0 |
|   | 4 | 0 | 0 | 0 | 1 | 1 | 1 | 0 |
|   | 3 | 0 | 0 | 0 | 1 | 0 | 1 | 1 |
|   | 3 | 0 | 0 | 0 | 1 | 1 | 0 | 1 |

FIG 3. (Cont'd)

| | | | | | | | | |
|---|---|---|---|---|---|---|---|---|
| | 3 | 1 | 0 | 0 | 0 | 1 | 0 | 1 |
| | 3 | 1 | 0 | 0 | 0 | 1 | 1 | 0 |
| | 3 | 1 | 1 | 0 | 0 | 0 | 1 | 0 |
| | 3 | 0 | 1 | 0 | 0 | 0 | 1 | 1 |
| | 3 | 0 | 1 | 1 | 0 | 0 | 0 | 1 |
| | 3 | 1 | 0 | 1 | 0 | 0 | 0 | 1 |
| | 3 | 1 | 0 | 1 | 1 | 0 | 0 | 0 |
| | 3 | 1 | 1 | 0 | 1 | 0 | 0 | 0 |
| | 3 | 0 | 1 | 0 | 1 | 1 | 0 | 0 |
| | 3 | 0 | 1 | 1 | 0 | 1 | 1 | 0 |
| | 3 | 0 | 0 | 1 | 1 | 0 | 1 | 0 |
| | 3 | 0 | 0 | 1 | 1 | 0 | 1 | 0 |
| | 2 | 0 | 0 | 1 | 0 | 0 | 0 | 1 |
| | 2 | 1 | 0 | 0 | 1 | 0 | 0 | 1 |
| | 2 | 1 | 0 | 0 | 1 | 1 | 0 | 0 |
| | 2 | 1 | 1 | 0 | 0 | 1 | 1 | 0 |
| | 2 | 0 | 1 | 0 | 0 | 1 | 1 | 0 |
| | 2 | 0 | 0 | 1 | 0 | 1 | 0 | 1 |
| | 2 | 1 | 0 | 0 | 1 | 0 | 1 | 0 |
| | 2 | 0 | 1 | 0 | 0 | 1 | 0 | 1 |
| | 2 | 1 | 0 | 1 | 0 | 0 | 1 | 0 |
| | 2 | 0 | 1 | 0 | 1 | 0 | 0 | 1 |
| | 2 | 1 | 0 | 1 | 0 | 1 | 0 | 0 |
| | 2 | 0 | 1 | 0 | 1 | 0 | 1 | 0 |
| 5 | 5 | 0 | 0 | 0 | 0 | 0 | 1 | 1 |
| | 5 | 1 | 0 | 0 | 0 | 0 | 0 | 1 |
| | 5 | 1 | 1 | 0 | 0 | 0 | 0 | 0 |
| | 5 | 0 | 1 | 1 | 0 | 0 | 0 | 0 |
| | 5 | 0 | 0 | 1 | 1 | 0 | 0 | 0 |
| | 5 | 0 | 0 | 0 | 1 | 1 | 0 | 0 |
| | 5 | 0 | 0 | 0 | 0 | 1 | 1 | 0 |
| | 4 | 0 | 0 | 0 | 0 | 1 | 0 | 1 |
| | 4 | 1 | 0 | 0 | 0 | 0 | 1 | 0 |
| | 4 | 0 | 1 | 0 | 0 | 0 | 0 | 1 |
| | 4 | 1 | 0 | 1 | 0 | 0 | 0 | 0 |
| | 4 | 0 | 1 | 0 | 1 | 0 | 0 | 0 |
| | 4 | 0 | 0 | 1 | 0 | 1 | 0 | 0 |
| | 4 | 0 | 0 | 0 | 1 | 0 | 1 | 0 |
| | 3 | 0 | 0 | 0 | 1 | 0 | 0 | 1 |
| | 3 | 1 | 0 | 0 | 0 | 1 | 0 | 0 |
| | 3 | 0 | 1 | 0 | 0 | 0 | 1 | 0 |
| | 3 | 0 | 0 | 1 | 0 | 0 | 0 | 1 |
| | 3 | 1 | 0 | 0 | 1 | 0 | 0 | 0 |
| | 3 | 0 | 1 | 0 | 0 | 1 | 0 | 0 |
| | 3 | 0 | 0 | 1 | 0 | 0 | 1 | 0 |
| 6 | 6 | 0 | 0 | 0 | 0 | 0 | 0 | 1 |
| | 6 | 1 | 0 | 0 | 0 | 0 | 0 | 0 |
| | 6 | 0 | 1 | 0 | 0 | 0 | 0 | 0 |
| | 6 | 0 | 0 | 1 | 0 | 0 | 0 | 0 |
| | 6 | 0 | 0 | 0 | 1 | 0 | 0 | 0 |
| | 6 | 0 | 0 | 0 | 0 | 1 | 0 | 0 |
| | 6 | 0 | 0 | 0 | 0 | 0 | 1 | 0 |
| 7 | | 0 | 0 | 0 | 0 | 0 | 0 | 0 |

CONTACT CENTER SCHEDULING USING INTEGER PROGRAMMING

REFERENCES CITED

References Cited
U.S. PATENT DOCUMENTS

| | | | |
|---|---|---|---|
| 5,216,593 | June 1993* | Dietrich et al. | 345/467 |
| 5,911,134 | June 1999 | Castonguay et al.; | 364/401 |
| 6,044,355 | March 2000 | Crockett et al. | 705/8 |
| 6,192,346 | February 2001 | Green | 364/401 |
| 6,278,978 | August 2001 | Andre et al. | 705/7 |
| 6,622,134 | September 2003* | Sorkin | 706/20 |
| 2004/0054564 | March 2004* | Fonseca et al. | 705/007 |
| 6,856,680 | February 2005* | Mengshoel et al. | 379/265.06 |
| 2006/0112049 | May 2006* | Mehrotra et al. | 706/046 |
| 7,249,047 | July 2007* | Arguello et al. | 705/9 |

*cited by examiner

OTHER PUBLICATIONS

Danzig, G. B., "A Comment on Edie's 'Traffic Delays at Toll Booths'," *Operations Research*, vol. 2, 339-341, 1954.

Holloran, T. J., and Byrn, J. E., "United Airlines Station Manpower Planning," *Interfaces*, vol. 16, 39-50, 1986.

Nanda, R., and Browne, J., *Introduction to Employee Scheduling*, Van Nostrand Reinhold, 1992.

Taha, H. A., *Operations Research*, $4^{th}$ ed., Macmillan, Inc., 1987.

Wolsey, L. A., *Integer Programming*, John Wiley & Sons, 1998.

FIELD OF THE INVENTION

The invention pertains to the field of computer systems and computer implemented methods. More specifically, the invention pertains to methods and computer systems for scheduling agents with multiple skills optimally at contact centers to satisfy time varying agent staffing requirements for multiple contact types.

BACKGROUND OF THE INVENTION

The need for scheduling agents optimally in contact centers arises in a broad range of industry areas. Examples include call centers providing inbound or outbound services, telephone operator centers, catalog sales centers, hospitals, police stations, airports, maintenance and installation operations, manufacturing, etc. Agents may be call center operators, technicians, workers, servers, nurses, etc. Contact centers may include any service center providing services to its customers through their agents. Many manufacturing operations may also fit into a contact center paradigm with similar needs and challenges in terms of worker or crew scheduling. Scheduling agents may be done a day at a time by specifying daily shift start time, shift length, time for the relief and lunch breaks, or to cover an entire week specifying, in addition to specifying daily shift schedules, work and non-work days. Contact centers use one or more interaction media to provide the desired services to their customers. Interaction media (also referred to as "contact types") may include telephone calls, web chat, email, fax, etc. It may also include contacts using different languages such as English, Spanish, etc., and/or different services such as sales, technical help, etc. Customers choose their time and media of contact to interact with the contact center agents. The contact type used by a customer may require an agent with a special skill (e.g. language skills, writing proficiency). Moreover, agents may possess only some of the skills needed to serve customers using different contact types. Agents with the same skill set form a skill group (also referred to as "agent skill group").

One of the critical tasks in contact center management is workforce scheduling. In such systems, workload changes during the course of an operating day, and from one day to another during a week. While understaffing will lower labor costs, it will result in poor service levels and longer waiting times for customers. Overstaffing, on the other hand, will improve service levels and lower waiting times, but will result in underutilized agents and higher labor costs. Hence, it is important for contact center managers to schedule their workforce in an optimal manner to minimize labor costs while meeting the projected agent and skills requirements. The present invention provides a method for formulating the workforce scheduling environment and requirements at a plurality of contact centers as a Mixed Integer Linear Programming (MILP) model, and a solution algorithm for developing optimal schedules for agents.

Traditionally, the task of developing work schedules to meet the forecasted agent and skill requirements is carried out manually. Manual scheduling when there is time varying workload and agent requirements, various daily shift and weekly tour scheduling rules, and multiple agent groups with different sets of skills and full-time/part-time work requirements is laborious and inefficient. Manpower scheduling in a typical contact center environment may involve an astronomical number of potential schedules, making manual evaluation of even a very small fraction of them to find an efficient schedule impractical.

In the past, a number attempts were made to develop more effective methods for workforce scheduling. Even though terms such as "optimal schedule", "optimized schedule" or "local optimal" were used in their descriptions, none of the prior art agent scheduling methods states or verifies the necessary and sufficient conditions for optimality in scheduling agent. Like the manual scheduling method, the prior art agent scheduling methods use a set of rules of thumb to develop agent schedules. None of them presents any evidence of, or guarantee the optimality of the schedules that may be obtained using the rules of their methods.

In the field of mathematical optimization, there are proven necessary and sufficient conditions for a solution to an optimization problem to satisfy in order to be the optimal (absolutely the best) solution (Taha, 1987, pages 743-779). The method of the present invention first develops an MILP model for which these necessary and sufficient conditions are well stated, and then uses an algorithm that would generate an optimal solution satisfying these conditions.

U.S. Pat. No. 5,911,134 issued on Jun. 8, 1999 to Castonguay et al. describes a method for developing weekly tour schedules in call centers for agents with a single skill type. This method describes tour and shift construction rules to select tour and daily shift templates from the available ones, one day at a time, using measures such as "coverage", and break scheduling rules to schedule daily breaks (U.S. Pat. No. 5,911,134, col. 18, lines 26-46, and FIG. 11). The method also includes post-processing steps to eliminate the redundant tours, level break times, and take employee preferences into consideration. No evidence to suggest that the schedules obtained using these rules will satisfy the necessary and sufficient conditions for optimality in a workforce scheduling problem is provided or known. As in the case of manual scheduling, the existence of an astronomical number of potential schedules, even in small call center scheduling environments, makes it very unlikely to locate the optimal schedule with the tour and shift construction rules used by this method.

U.S. Pat. No. 6,044,355 issued on Mar. 28, 2000 to Crockett et al. describes a simulation method for developing weekly tour schedules in a contact center environment involving multiple agent groups with a plurality of skill sets, and a plurality of contact types requiring different agent skills. The method uses a scheduler and an Automatic Call Distributor (ACD) simulator. However, no working details or description of the scheduler, and how it develops a schedule is included in the patent document. It was disclosed that the method uses a "scheduler program" (U.S. Pat. No. 6,044,355, col. 6, lines 18-36). No evidence to suggest that the schedules obtained using the scheduler program considered will satisfy the necessary and sufficient conditions for optimality in a workforce scheduling problem is provided or known.

U.S. Pat. No. 6,278,978 issued on Aug. 21, 2001 to Andre et al. describes a method that may be used to post-process an initial schedule available from another source outside of the method by applying a rule-based interchange procedure. The method is provided for scheduling agents with a single skill type. The method begins by acquiring an agent schedule developed by another method. The method then unschedules an agent from a shift in the schedule, evaluates the value of a "score" function for all other schedules that may assign this agent to a different shift, and selects a shift using the score function to improve the schedule. The method also considers rescheduling of breaks, again using the score function. Interchanging two or more activities to improve the quality of an initial solution to a problem is a well-known strategy in the field of Optimization and the related research literature. It is also well known in the field of Optimization that interchanging (rescheduling) one or more agents and shifts simultaneously doesn't guarantee the optimality of the solution developed and the satisfaction of the optimality conditions.

A primary object of the present invention is to overcome these limitations of the prior art agent scheduling methods. The present invention uses Mixed Integer Linear Programming approach (MILP) (Wolsey, 1998) to develop a mathematical model of a workforce scheduling environment. A number of researchers including Danzig (1954) proposed MILP models for workforce scheduling. Difficulties with the use of the prior art MILP models for workforce scheduling are well documented (Nanda and Browne, 1992, page 206, Holloran and Byrn, 1986, page 13). The MILP model proposed by Dantzig (1954), for example, enumerates all possible combinations of shift and tour parameters resulting in tens of trillions of decision variables, making it very inefficient and impossible to solve even in small contact center environments. To overcome these limitations of the prior art MILP agent scheduling models, the present invention formulates daily break, and days-off scheduling implicitly (i.e. not explicitly enumerating all possible combinations). Thus, the method of the present invention formulates a significantly smaller but equally powerful MILP model, and uses various extensions of it.

A further limitation of the prior art MILP models is that they only consider agent scheduling environments involving a single agent skill group. Recent technological developments in ACD's used in call centers to queue and assign calls to agents, and incorporation of other types of contact media such as email and fax, made contact center managers to realize that agents with different types of skills are needed to be scheduled to handle these contact types (e.g. a Spanish speaking agent to answer a caller speaking in Spanish, or agents with good writing skills to respond to emails). Thus, the agent scheduling task became more complex since the agent scheduling method used should take the time-varying demand for different agent skill types, and available agent groups with different skill sets (e.g. Spanish & English speaking sales, Chinese & English writing for technical help emails, and English only agent groups) into consideration in scheduling agents. It is another object of the present invention to disclose a method for formulating MILP models for scheduling environments involving a plurality of agent skill groups, and a plurality of contact types with time-varying workload for specific agent skills.

The present invention also discloses a solution algorithm that solves a number of sub-problems (or nodes) with the use of the standard Branch and Cut (B&C) algorithm for MILP problems. The solution method supplements the B&C algorithm by a Rounding Algorithm (RA algorithm) to locate the optimal solution of the MILP model of the invention. The optimality condition (both necessary and sufficient) for an MILP model is well documented in the field of Optimization; An all-integer solution that satisfies all of the constraints of an MILP with a minimization (maximization) type objective function, and has an objective value that is better than the best lower bound (upper bound) for any of the sub-problems in the B&C algorithm is a global (i.e. absolute) optimal solution to that MILP model (Wolsey, 1998). Once the optimality condition is satisfied by an all-integer solution found during the execution of this solution algorithm (either in the B&C algorithm or in the RA algorithm), an optimal agent schedule is reported using the information in the optimal solution of the MILP model found.

It is still another object of the present invention to provide a computer implemented optimal workforce scheduling method for contact centers that schedule their workforce to meet varying workload during the course of a day, and from one day to another during a week.

SUMMARY OF THE INVENTION

The method of the present invention first formulates a skills based or non-skills based agent scheduling environment involving a plurality of agent skill and work groups, and plurality of contact types as an MILP model including various contact center constraints and requirements. The formulation step of the present invention involves, first, the definitions of various decision variables, and parameters, and the formulation of an objective function. The objective function of the MILP model of the present invention determines a measure of effectiveness (or merit) for each solution. Examples of the objective function in the method include total schedule cost, total time scheduled, total paid time scheduled, total agent preference, etc. The formulation step also includes the expression of contact center constraints, and agent and skill requirements in all periods to be scheduled as mathematical equalities or inequalities. Finally, constraints that restrict the values of all decision variables to nonnegative values, and some variables to nonnegative integer values only are added to the formulation.

The MILP model of the present invention may have one or more solutions (also called "feasible solutions") that satisfy all contact center constraints and requirements included in it. The optimal solution of an MILP model is merely finding the best feasible solution in terms of its objective function value among all feasible solutions. The best feasible solution with the most favorable objective function value is the optimal solution and satisfies the optimality condition. Moreover, every agent schedule satisfying the optimality condition in a specific workforce environment, when all contact center constraints and requirements in each planning period are satisfied, is also a global or absolute optimal solution (e.g. see Taha, 1987). The optimal agent schedule is then reported using the optimal solution.

To find a global optimal solution to the MILP model of an agent scheduling environment, the present invention applies an enhanced optimization algorithm combining the standard technique for solving MILP models optimally, the B&C algorithm (Wolsey, 1998), with an RA algorithm. An MILP model contains one or more decision variables whose values are restricted to non-negative integer values. In the case of the MILP of the present invention, for example, the number of agents assigned to a weekly work pattern specifying their work and non-work days can't take a fractional value (e.g. it can't be 4.75 agents). The B&C algorithm first solves the MILP model (called "node zero") without integrality constraints for these decision variables. This version of the MILP model is referred to as the Linear Programming (LP) relaxation of the MILP. If the values of the decision variables in this solution also satisfy the integrality constraints for all decision variables, the solution is optimal. The solution algorithm of the present invention then terminates, and the schedule-reporting step begins.

If the values of the decision variables in the solution of the LP relaxation at node zero don't satisfy all integrality constraints, then the solution algorithm of the present invention calls the RA algorithm to search for an integer feasible solution. The RA algorithm first retrieves the values of the decision variables found by the B&C algorithm to the LP relaxation. The RA algorithm then rounds the values of the integer restricted decision variables with fractional values either up or down in an attempt to find an integer feasible solution. After rounding the values of the decision variables, the RA algorithm also checks the constraints of the MILP model. If the rounded solution is violating one or more constraints of the MILP model, values of the variables are adjusted to restore feasibility including addition of new agents to meet the agent requirements in every period, and for all skill types. If no solution satisfying all constraints can be found with the current solution, the RA algorithm terminates and control is returned back to the B&C algorithm. Otherwise, if an integer feasible solution to the MILP model is found, the RA algorithm calculates the objective value for that solution, and compares it with the best known solution to the MILP model, if one is available. If the new integer feasible solution found has a more favorable objective value, the new integer feasible solution replaces the best known solution to the MILP. The RA algorithm then terminates, and returns the new integer solution found back to the B&C algorithm.

If the best known (integer feasible) solution was changed in the RA algorithm, the B&C algorithm updates the best integer solution known for its own use, and forms new sub-problems (nodes) by adding new constraints (Wolsey, 1998). The entire process is then repeated; the B&C algorithm chooses a new sub-problem, and solves its LP relaxation. If the LP relaxation has a feasible solution satisfying all of the constraints but some of the integrality constraints for some decision variables, the B&C algorithm transfers control to the RA algorithm which searches for an integer feasible solution through rounding and adding more agents to the schedules. The solution algorithm of the present invention terminates when all sub-problems in the B&C algorithm are terminated (sub-problem termination conditions in the B&C algorithm are given in Wolsey, 1998). That is when the optimality condition is satisfied by an integer feasible solution to the MILP model. When this condition is satisfied, control is transferred to the schedule-reporting step.

In the schedule reporting step of the present invention, an optimal agent schedule with daily start and stop times, work and non-work days, daily break times for every work day, agent allocation to contact types in every period to be scheduled are reported for every agent tour schedule.

BRIEF DESCRIPTION OF THE DRAWINGS

For a more complete description of the present invention and its merits, reference should be made to the Description of the Preferred Embodiment.

FIG. 3 shows all possible work patterns in a week.

DESCRIPTION OF THE PREFERRED EMBODIMENT

Figure 1:
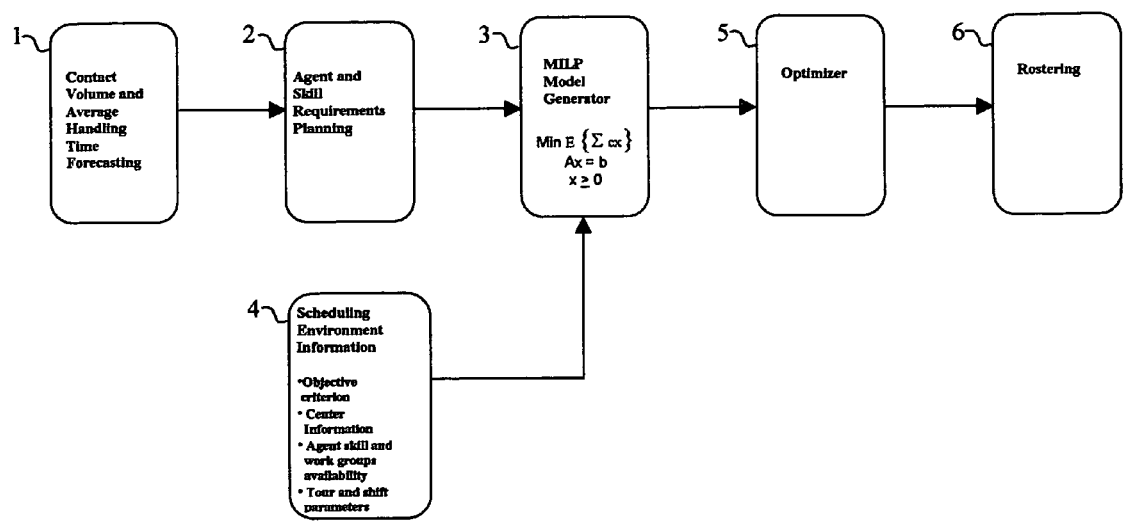
FIG. 1 shows the process architecture for optimal workforce scheduling with the method of the present invention, and its computer implementation.

FIG. 1 shows process architecture for optimal workforce scheduling with the method of present invention, and its computer application. It consists of several sub-processes including forecasting (1), agent and skills requirements planning (2), scheduling environment information input (3) (e.g. center information, agent skills and work group availability, tour and shift parameters), MILP model generator (4), optimizer (5), and rostering (6) processes. The main function of the forecast generator is to make predictions of future contact volumes, and average handling times (service times) for the contact types offered in each planning period during the days in the schedule interval (e.g. a week). This sub-process uses statistical techniques to analyze patterns in the historical data, and develop forecasts. Agent and skill requirements planning module (2) combines contact volume and average handling time forecasts with service level targets (e.g. 80% of incoming calls answered within 20 seconds of their receipt) to determine agent and skill requirements in each planning period to be scheduled. In a multi-skilled environment, this module determines the agent and skills mix from the available agent skill groups that are needed in each planning period to deliver the targeted service levels to all contact types. This process also takes the economies of multi-skilled scheduling environment into consideration. Contact center managers input the environment information including the objective criterion to be optimized, and various contact center parameters (e.g. number, location, operating hours), agent skill and work groups, and tour and shift parameters to module (3). The next two modules, the MILP model generator (4) and optimizer (5), use the method of present invention to develop optimal agent schedules to meet agent and skills requirements developed in module (2) using the scheduling environment parameters provided in module (3). The present invention provides a method for the MILP model generation for a workforce scheduling environment, and an algorithm for a near-optimal or optimal solution of the MILP model generated by the MILP model generator to develop agent schedules. The method of the present invention covers both non-skills based, and skills based agent scheduling environments.

The scheduling environment may involve one or more contact centers. In the case of multiple contact centers, each contact center may be scheduled independently to meet their allocated agent and skills requirements with their own agent skill groups, agent work groups, agent availability, operating hours, and tour and shift scheduling rules. In this case, the method of the invention formulates the scheduling environment at each contact center as an MILP model and solves it optimally to obtain an optimal schedule. Alternatively, a plurality of contact centers may be scheduled as a virtual contact center. In this case, agent and skills requirements of different contact centers are combined using a common time zone, and the method of invention formulates one MILP model for these centers to include combined agent and skills requirements with the centers' agent skill groups, agent work groups, agent availability, operating hours, and tour and shift scheduling rules. When solved together, the optimal schedule provides a combined schedule for agents at all of the centers included. The unique operating characteristics of each contact center such as operating hours, tours and shift scheduling rules, agent skill and work group availability, and agent availability are satisfied by modeling them in one common time zone, and identifying them by contact center specific identification numbers.

Figure 2:
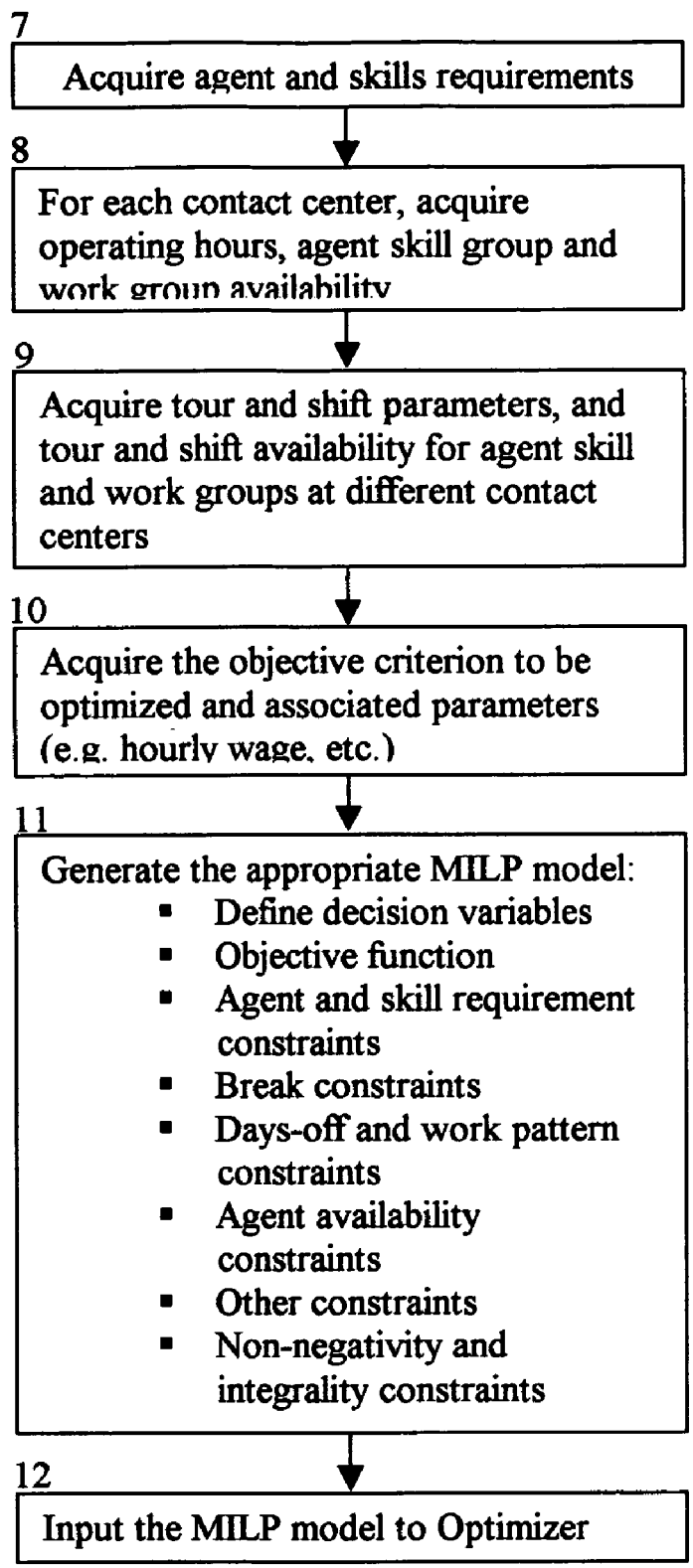
FIG. 2 shows a flowchart of the MILP model generation of the invention.
Figure 4A:
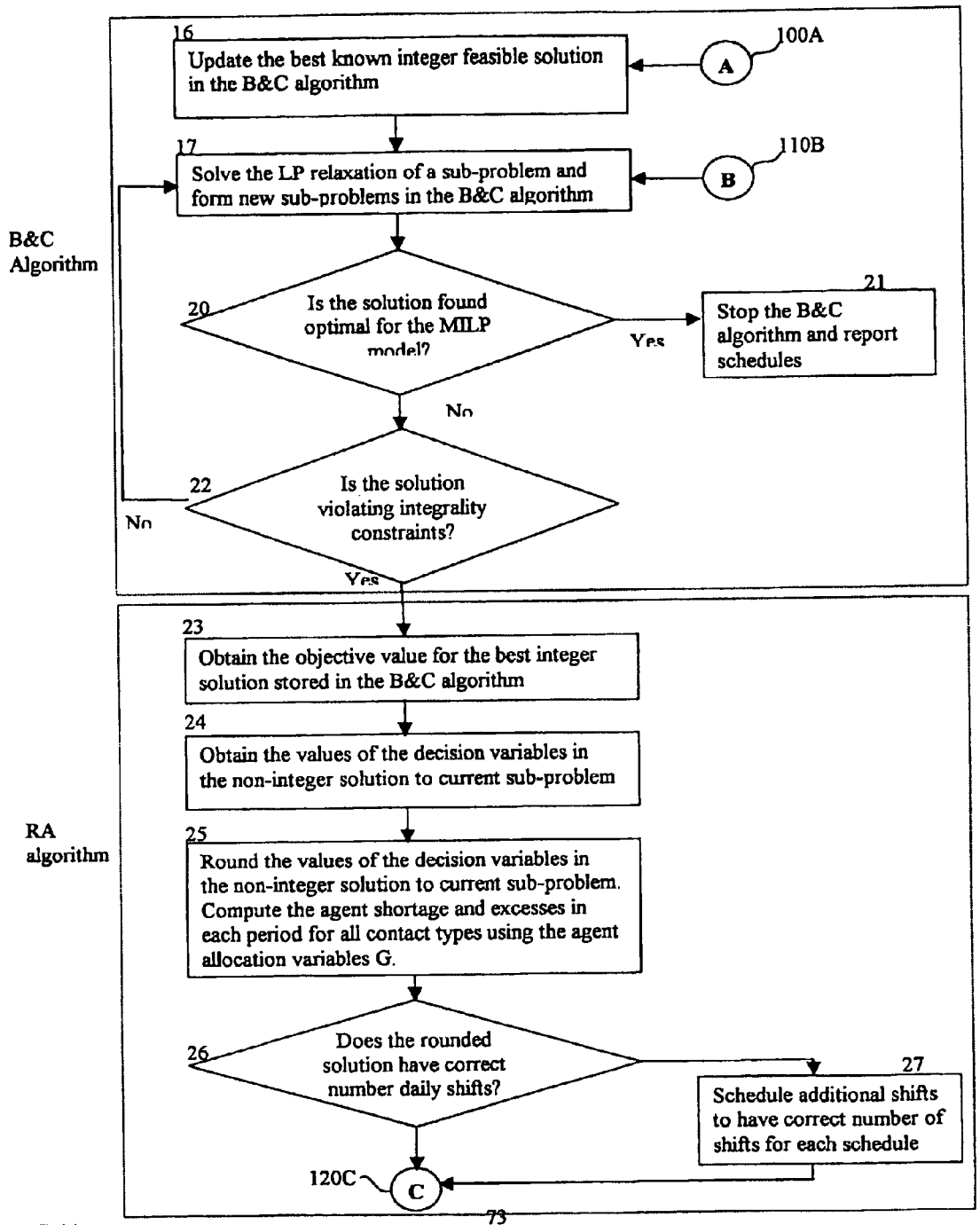
FIG. 4A, FIG. 4B and FIG. 4C show a flowchart of the solution method for the MILP model of the invention.
Figure 4B:
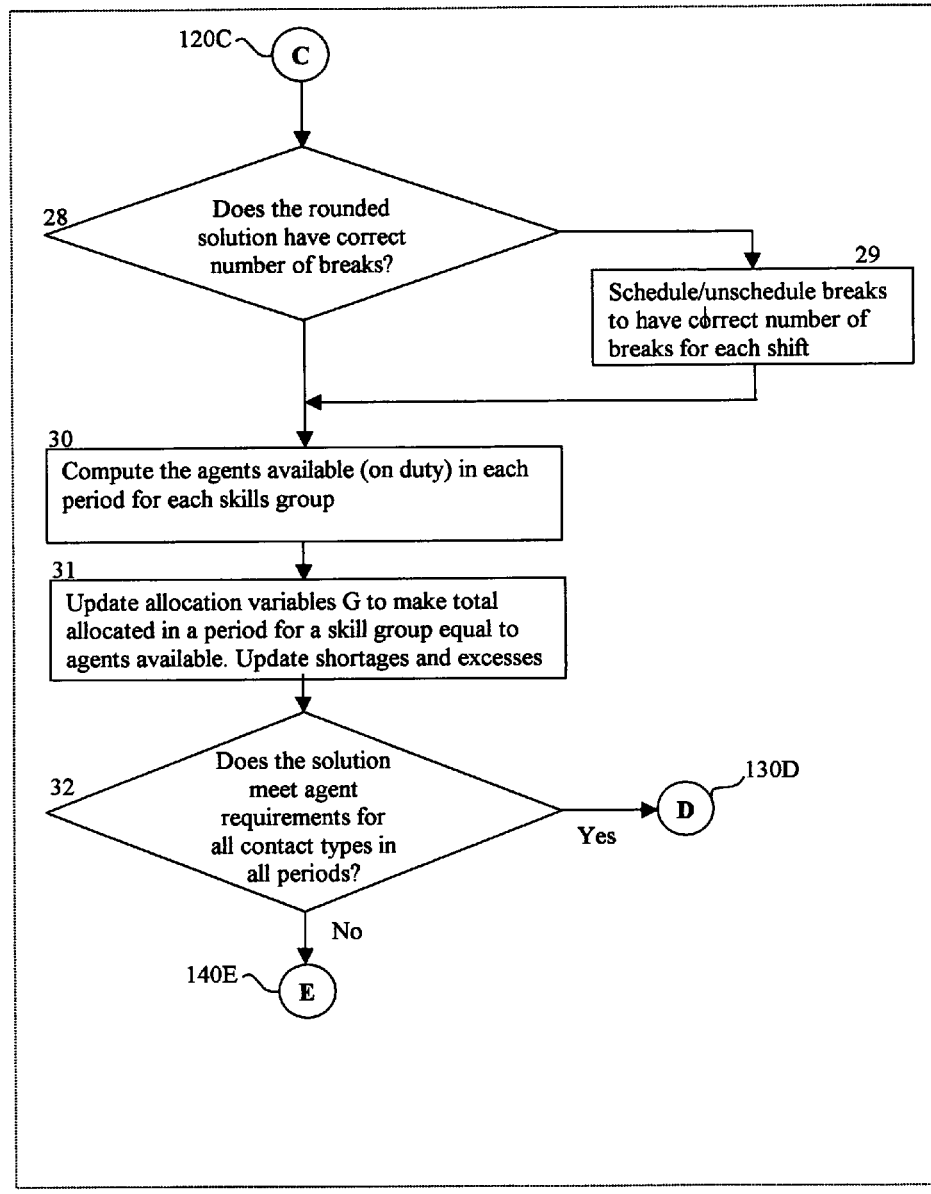
Figure 4C:
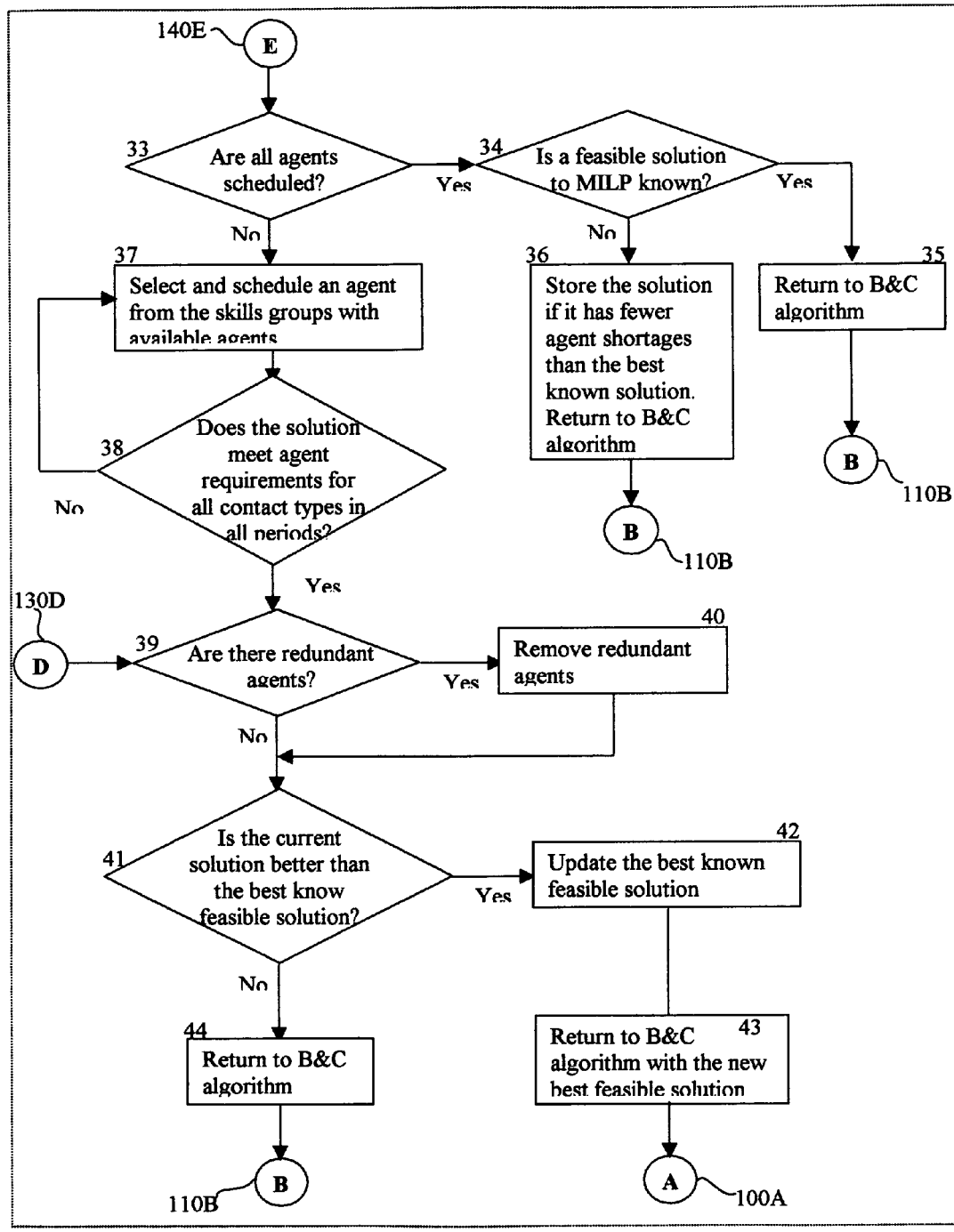

FIG. 2 shows the basic steps of the MILP model generation method of the present invention. The following description, referring to FIG. 2, is presented to explain the MILP model generation method in its general case, before proceeding to the more specific scheduling environments.

Step 7: Acquire agent and skills requirements for each planning period to be scheduled.

Step 8: For each contact center, obtain daily operating hours, agent skill groups, work groups for these agent skill groups specifying various work patterns such as full-time 40 hours/week, or part-time 30 hours/week, and the scheduling paradigm as to whether to schedule each contact center separately or a plurality of them in a virtual contact center environment.

Step 9: Acquire tour and shift parameters and scheduling rules, and their availability to agent skill and work groups at different contact centers.

Step 10: Acquire the objective criterion to be optimized and associated cost and benefit parameters.

Step 11: Generate the appropriate MILP model by first defining decision variables, parameters and sets, and then formulating the objective function, agent and skill requirement constraints, break constraints, days-off and work pattern constraints, agent availability constraints, other schedule related constraints, and non-negativity and integrality constraints.

Step 12: Input the variables, objective function, and constraints of the MILP model formulated to optimizer (2).

A number of MILP formulations for agent scheduling in a non-skills based environment (also referred to as "single skill environment" in the rest of this patent document) and their extensions are discussed first. The MILP model generation method of the present invention for skills based agent scheduling environments involving agents with different skills serving multiple contact types is disclosed after this discussion. The method of the invention for the solution of the MILP model is disclosed thereafter.

To facilitate the description of the MILP model and its extensions used by the present invention in this patent document, a variable or set defined with a subscript is shown as flat text when the variable or set itself is a subscript of another term. For instance, a set defined as $B1_{kih}$ is typed as $_{B1kih}$ in $\Sigma_{t \in B1kih}$ where it is a subscript of the summation sign $\Sigma$. Moreover, symbols "$\epsilon$" and "$\in$" are both used to imply membership in a set or indicate an element of a set.

Workforce Scheduling with Tours Requiring Consistent Daily Start Time and Shift Length in a Single Skill Environment To facilitate the presentation, this discussion assumes that all agents have the same skill set (i.e. not a skills based scheduling environment). In addition, the following assumptions regarding the scheduling environment are made to facilitate the presentation: Each agent works 5 days and receives two consecutive days-off during a week; There are one or more contact centers operating 24 hours or less a day and 7 days a week. A day is divided into equal planning periods (e.g. 15-minute intervals) that are indexed sequentially in $T_h$ for day h, h=1, ..., 7. As disclosed below, none of these specifications is restrictive on the MILP model of the method. A person with ordinary skills at art can easily extend the MILP model of the method to cases where the number of work days may be less or greater than 5 days per week, a work tour less than or exceeding 7 days, any number of consecutive days-off, and a scheduling environment where the time period may be less or greater than 15 minutes.

Moreover, for this discussion, it is also assumed that a tour specifies a weekly work pattern that is seven days long with the following breaks in the work schedule: (i) Daily breaks in the shift schedule including two relief breaks, and one lunch break during a work day, and (ii) two consecutive non-work days (i.e. days-off). We assume that each relief break is one planning period, and lunch break is two planning periods long. Extensions of the MILP model of the method to tours with more or less breaks, and different break durations are discussed with other cases below. Agents assigned to a tour have the identical daily shift start times and shift lengths during a week. The present invention extends the MILP model to the scheduling environments involving non-identical daily shift start times and shift lengths later in this document. The scheduling environment may include more than one tour type. Each tour type specifies a set of daily shift start times, and a shift length for seven days. In the general case, different tour types may also have different number of consecutive or non-consecutive off days, number of daily breaks and break durations.

Let K be the set of all distinct tour types available to assign agents. Each tour type k has a predetermined set of start times given in $I_k$. Let $a_{kiht}$ be equal to one if period t on day h is in the shift span (that is, a work, break, or days-off period) of tour k with a daily start time of i, and zero otherwise. Suppose that the maximum number of agents available to assign to tour k is limited to $D_k^{max}$. Let $X_{ki}$ be the number of agents assigned to tour k with a daily start time of period i. Let $C_{ki}$ be the weekly cost (wages and benefits, etc.) of assigning an agent to tour k with a daily start time of i, i$\in I_k$, and k$\in$K. Let $U_{kiht}$, $W_{kiht}$ and $V_{kiht}$, daily break variables, be the numbers of agents assigned to tour k with a daily start time of i and starting their first relief, lunch and second relief breaks in period t on day h, respectively. Daily relief and lunch breaks must start and end within the break windows specified for them. Let $B1_{kih}$, $B2_{kih}$ and $B3_{kih}$ be the sets of planning periods on day h during which an employee assigned to tour k with a daily start time of i may start, respectively, his/her first relief, lunch and second relief break and complete within the time windows specified for these breaks. Break variables $U_{kih(t1)}$, $W_{kih(t2)}$ and $V_{kih(t3)}$ are defined for t1$\in B1_{kih}$, t2$\in B2_{kih}$, t3$\in B3_{kih}$, and i$\in I_k$, k$\in$K, h=1, ..., 7, respectively. Further, let $T1_{kht}$, $T2_{kht}$ and $T3_{kht}$ be the sets of start times for tour k for which period t on day h is, respectively, a first relief, lunch, and second relief start period within the break windows specified for them. Let $Y_{kih}$ be the number of agents assigned to tour k with a daily start time of i who are scheduled start their consecutive non-work days (days-off) on day h. Finally, let $b_{ht}$ be the number of agents required in period t on day h to deliver the desired service level to customers. The MILP model of the present invention for the scheduling environment assumed can be stated as follows.

Minimize $$\sum_{k \in K} \sum_{i \in I_k} C_{ki} X_{ki} \tag{1}$$

Subject to $$\sum_{k \in K} \sum_{i \in I_k} a_{kiht} X_{ki} - \sum_{k \in K} \sum_{i \in I_K} a_{kiht}(Y_{kih} + Y_{ki(h-1)}) - \sum_{k \in K} \sum_{i \in T1kht} U_{kiht} - \sum_{k \in K} \sum_{i \in T2kht} (W_{kiht} + W_{kih(t-1)}) - \sum_{k \in K} \sum_{i \in T3kht} V_{kiht} \geq b_{ht}, t \in T_h, h=1, \ldots, 7, \tag{2}$$

$$X_{ki} - Y_{kih} - Y_{ki(h-1)} = \sum_{t \in B1kih} U_{kiht}, i \in I_k, k \in K, h=1, \ldots, 7, \tag{3}$$

$$X_{ki} - Y_{kih} - Y_{ki(h-1)} = \sum_{t \in B2kih} W_{kiht}, i \in I_k, k \in K, h=1, \ldots, 7, \tag{4}$$

$$X_{ki} - Y_{kih} - Y_{ki(h-1)} = \sum_{t \in B3kih} V_{kiht}, i \in I_k, k \in K, h=1, \ldots, 7, \tag{5}$$

$$X_{ki} = \sum_h Y_{kih}, i \in I_k, k \in K, \tag{6}$$

$$\sum_{i \in I_k} X_{ki} \leq D_k^{max}, k \in K, \tag{7}$$

$X_{ki}, Y_{kih}, U_{kiht}, W_{kiht},$ and $V_{kiht} \geq 0$, and integer for all $k, i, h,$ and $t$. (8)

An MILP formulation (the terms "model" and "formulation" are used to have the same meaning in the remainder of this patent document) consists of decision variables, objective function, constraints, and parameters as in (1-8) above. Decision variables represent various activities, and decisions regarding the values they should take. One objective in formulating an MILP model such as (1-8) is to determine the values for decision variables that minimize (or maximize in some other MILP models) the objective function, subject to constraints. Values a decision variable can take are limited by the constraints of the MILP formulation. A set of values for all decision variables satisfying all constraints of an MILP formation is called an integer feasible solution to the formulation. An integer feasible solution that provides the best value for the objective function of an MILP over all possible integer feasible solutions is called an optimal solution (Taha, 1987). In the MILP formulation (1-8), decision variables include $X_{ki}, Y_{kih}, U_{kiht}, W_{kiht}$ and $V_{kiht}$ for all k, i, h, and t. Constraints are given in (2-8), and the objective function in (1). The terms decision variables, constraints, objective function, feasible solution and optimal solutions are used to carry the meanings stated above, although different MILP models and extensions may have different sets of decision variables, constraints, and objective functions. When all integrality constraints in an MILP formulation (e.g. constraints (8) above) are relaxed, the resulting model is referred to as the Linear Programming relaxation ("LP Relaxation"). A set of values satisfying all constraints except the integrality constraints of an MILP is a feasible solution to its LP relaxation. An optimal solution to the LP relaxation may or may not satisfy the integrality constraints of the original MILP model. If an optimal solution to the LP relaxation of an MILP also satisfies all of its integrality constraints, it is also an optimal solution to the MILP (Taha, 1987).

Objective function (1) is the total cost of assigning agents to various tour types and start times per week. Constraint (2) ensures that the total number of agents assigned to various tours and available in period t on day h (first term on the left side of (2)) minus the number of agents who are assigned to these tours but taking this day off (second term on the left side of (2)) and the number of agents who are at work on day h but taking their first relief (third term on the left side of (2)), lunch (forth term on the left side of (2)), and second relief (fifth term on the left side of (2)) in period t on day h is sufficient to meet the agent requirement, $b_{ht}$, in that period. The second term on the left side of (2) includes agents who are starting their consecutive days-off schedule on day h as well as those who started a day earlier on day (h−1). Break constraints (3-5) ensure that one first relief, one lunch, and one second relief break are scheduled for each agent who is assigned to tour k with a daily start time of i and working on day h. Thus, the number of first relief, lunch, and second relief breaks scheduled for tour k with a daily start time of i on a given day is equal to the number of agents assigned to this tour and start time minus the number of them scheduled to take day h off, $X_{ki} - Y_{kih} - Y_{ki(h-1)}$ (because of two consecutive days-off per week requirement). Constraint (6) ensures that a set of two consecutive days-off is scheduled for every agent assigned to tour k with a daily start time of i. Constraint (7) ensures that the total number of agents assigned to tour type k doesn't exceed the maximum number of agents that are available to assign to this tour type. This constraint can easily be modified to limit the number of agents that can be assigned to a set of tour types (e.g. full time 40-hour a week tours may include 8-hour shifts and 5 work days a week, and 10-hour shifts and 4 work days a week). Finally, constraint (8) restricts the tour variables $X_{ki}$, days-off variables $Y_{kih}$, and break variables $U_{kiht}$, $W_{kiht}$, and $V_{kiht}$ to nonnegative integers to avoid negative values and/or fractional agent schedules.

Extensions of MILP Model (1-8)

It should be clear to those skilled in the art that the specific embodiments and the MILP model disclosed above may be readily utilized as a basis and extended to other scheduling environments without departing from the scope of the invention. For example, objective function (1) can be easily reformulated to minimize the total amount of agent time scheduled or paid agent time scheduled by setting $C_{ki}$ equal to scheduled or paid time per week per agent assigned to tour k with a daily start time of i, $i \in I_k$, and $k \in K$. Also, if agents rate their most preferred, second most preferred, etc., tours using an RAting system, these ratings for various tours and start times can be aggregated and used in the objective function to maximize agent preference in scheduling tours and start times. Note that in this case, in order to not to schedule redundant tours (a redundant tour is a tour that can be removed without causing agent shortages in any of the periods covered by that tour during the week) and increase agent costs unnecessarily, rating system should assign the lowest value to the most preferred tour, a higher to the second most preferred tour, etc. Consequently, the objective function will remain as of minimization type to maximize agent preferences.

Another extension of MILP model (1-8) involves agent scheduling when there aren't enough agents to meet the agent requirements in every period to be scheduled. In this case, objective function (1), and constraint (2) are modified by adding overstaffing and understaffing variables. Let $O_{ht}$ be the number of agents in excess of agent requirements, and $S_{ht}$ be the agent shortage in period t on day h. A penalty for shortages in a period, $P_{ht}$, is included in the objective function to find the optimal schedule that minimizes the total agent cost plus the shortage cost.

Minimize $$\Sigma_{k \in K} \Sigma_{i \in Ik} C_{ki} X_{ki} + \Sigma_h \Sigma_{t \in Th} P_{ht} S_{ht} \quad (9)$$

Constraint (2) is then formulated by adding $O_{ht}$ for overstaffing and $S_{ht}$ for shortages to its left side as follows:

$$\Sigma_{k \in K} \Sigma_{i \in Ik} a_{kiht} X_{ki} - \Sigma_{k \in K} \Sigma_{i \in Ik} a_{kiht} (Y_{kih} + Y_{ki(h-1)}) - \Sigma_{k \in K} \Sigma_{i \in T1kht} U_{kiht} - \Sigma_{k \in K} \Sigma_{i \in T2kht} (W_{kiht} + W_{kih(t-1)}) - \Sigma_{k \in K} \Sigma_{i \in T3kht} V_{kiht} + S_{ht} - O_{ht} = b_{ht}, t \in T_h, h=1, \ldots, 7, \quad (10)$$

$S_{ht}, O_{ht} \geq 0$, for all $t \in T_h$ and $h$.

If a certain amount of overstaffing is needed for other tasks (e.g. to answer email or fax based contacts), it can be ensured by restricting the overstaffing to be greater than or equal to the desired level $f_{ht}$.

$$\Sigma_{t \in Th} O_{ht} \geq f_{ht}, t \in T_h, h=1, \ldots, 7, \quad (11a)$$

If up to a certain amount of understaffing staffing is tolerable (e.g. to see if the total cost can be reduced), this can be achieved by adding a similar constraint:

$$\Sigma_{t \in Th} S_{ht} \geq d_{ht}, t \in T_h, h=1, \ldots, 7, \quad (11b)$$

where $d_{ht}$ is the maximum understaffing tolerated on day $h$. Constraints (11a) and (11b) can easily be further modified to impose limits for a specific period(s) on day $h$.

If a tour type has more than three breaks on a given day (e.g. first relief, lunch, second, and third relief breaks on Thursdays and Fridays), the method of the present invention extends MILP model (1-8) by introducing a set of break variables and a break constraint (similar to constraints (5-7)) for every break that needs to be scheduled so that every agent assigned to tour k and working on that day will have the correct number of breaks scheduled for him/her. If agents assigned to a tour are given fewer breaks (e.g. part time agents working 4 hours a day), the method of the present invention extends MILP model (1-8) by excluding the break variables and constraints associated with the breaks not allowed.

Furthermore, if a tour type has a break longer than 2 consecutive planning periods, then the method of the present invention extends MILP model (1-8) by subtracting all agents who started their breaks in an earlier period but haven't completed yet and the agents who are starting their break in period t from the left side of constraint (2). For a 4-period break, for example, agents who started their breaks three periods earlier, two periods earlier, one period earlier, and agents starting in the current period will be subtracted from the number of agents scheduled in that period from the left side of constraint (2).

In MILP model (1-8), even though daily shift start times for an agent remain the same on different days, break times may vary from one work day to another. For instance, it is possible to have the first relief break of an agent be scheduled at 9:00am on Monday, and at 10:00am on Tuesday. If a tour (say tour k) requires consistent relief and lunch break times on all work days and for all agents starting at start time i to be on break at the same time in addition to consistent daily shift start times and shift lengths, these requirements are ensured by adding the following constraints the MILP model (1-8):

$$\Sigma_h U_{kiht} \leq q_k SU_{kit}, i \in I_k, t \in D1_{ki}, \quad (12a)$$

$$\Sigma_h W_{kiht} \leq q_k SW_{kit}, i \in I_k, t \in D2_{ki}, \quad (12b)$$

$$\Sigma_h V_{kiht} \leq q_k SV_{kit}, i \in I_k, t \in D3_{ki}, \quad (12c)$$

$$\Sigma_{t \in D1ki} SU_{kit} = 1, , i \in I_k, k \in K, \quad (13a)$$

$$\Sigma_{t \in D2ki} SW_{kit} = 1, , i \in I_k, k \in K, \quad (13b)$$

$$\Sigma_{t \in D3ki} SV_{kit} = 1, , i \in I_k, k \in K, \quad (13c)$$

$SU_{kit}, SW_{kit}, SV_{kit} \geq 0$ and integer.

where $D1_{ki}$, $D2_{ki}$, and $D3_{ki}$ are the sets containing the consistent (across the days of a week) daily first relief, lunch, and second break times in $B1_{kih}$, $B2_{kih}$, and $B3_{kih}$, respectively, $q_k$ is a very large number, $SU_{kit}$, $SW_{kit}$, and $SV_{kit}$ are binary variables taking a value of either zero or one to indicate whether period t is selected as the consistent daily first relief, lunch, or second relief break time, respectively.

Constraints (12a) and (13a) are restricting the daily first relief break times to one of the break times specified in $B1_{kih}$. Constraint (13a) ensures that only one relief break time is selected, that is, only one $SU_{kit}$ is equal to one while the others are zero. Thus, for example, if the first relief break times for a tour starting at 7:00am daily are $B1_{kih} = \{8:15am, 8:30am, 8:45am\}$, $h=1, \ldots, 7$, then only one of $SU_{ki(8:15)}$, $SU_{ki(8:30)}$, or $SU_{ki(8:45)}$ will be equal to one and the others will be equal to zero. Likewise, constraints (12b) and (13b) are restricting the lunch break times, and constraints (12c) and (13c) are restricting the second break times to consistent daily schedules.

MILP model (1-8) of the method is presented for tour types that require two consecutive non-work days be scheduled for each agent. The present invention extends MILP model (1-8) to include tours with 3 or more consecutive days-off by subtracting from the left sides of constraints (2-5) the agents assigned to this type of tours and who are off as part of their scheduled consecutive non-work days, and agents starting their days-off on day h.

If, however, tours in K require a minimum of two consecutive days off and, in addition, a total of $r_k$ non-consecutive days off, the present invention extends MILP model (1-8) as follows:

Mimimize $$\Sigma_{k \in K} \Sigma_{i \in Ik} C_{ki} X_{ki} \quad (14)$$

Subjec to $$\Sigma_{k \in K} \Sigma_{i \in Ik} a_{kiht} X_{ki} - \Sigma_{k \in K} \Sigma_{i \in Ik} a_{kiht} (Y_{kih} + Y_{ki(h-1)}) \\ - \Sigma_{k \in K} \Sigma_{i \in Ik} \Sigma_{m \neq h, (h-1)} a_{kiht} Z_{kimh} - \\ \Sigma_{k \in K} \Sigma_{i \in T1kht} U_{kiht} - \Sigma_{k \in K} \Sigma_{i \in T2ht} (W_{kiht} + W_{kih(t-1)}) - \\ \Sigma_{k \in K} \Sigma_{i \in T3kht} V_{kiht} \geq b_{ht}, t \in T_h, h=1, \ldots, 7, \quad (15)$$

$$X_{ki} - Y_{kih} - Y_{ki(h-1)} - \Sigma_{m \neq h, (h-1)} Z_{kimh} = \Sigma_{t \in B1kih} U_{kiht}, i \in I_k, \\ k \in K, h=1, \ldots, 7, \quad (16)$$

$$X_{ki} - Y_{kih} - Y_{ki(h-1)} - \Sigma_{m \neq h, (h-1)} Z_{kimh} = \Sigma_{t \in B2kih} W_{kiht}, i \in I_k, \\ k \in K, h=1, \ldots, 7, \quad (17)$$

$$X_{ki} - Y_{kih} - Y_{ki(h-1)} - \Sigma_{m \neq h, (h-1)} Z_{kimh} = \Sigma_{t \in B3kih} V_{kiht}, i \in I_k, \\ k \in K, h=1, \ldots, 7, \quad (18)$$

$$r_k Y_{kih} = \Sigma_{1 \neq h, (h+1)} Z_{kih1}, i \in I_k, k \in K, h=1, \ldots, 7, \quad (19)$$

$$Z_{kihm} \leq Y_{kih}, i \in I_k, k \in K, h=1, \ldots, 7, m \neq h, (h+1) \quad (20)$$

$$X_{ki} = \Sigma_h Y_{kih}, i \in I_k, k \in K, \quad (21)$$

$$\Sigma_{i \in Ik} X_{ki} \leq D_k^{max}, k \in K, \quad (22)$$

$X_{ki}, Y_{kih}, Z_{kihm}, U_{kiht}, W_{kiht}$, and $V_{kiht} \geq 0$ and integer for all $k$, $i$, $h$, $m$, and $t$. (23)

where $Z_{kihm}$ is defined as the number of agents who are assigned to tour k with a daily start time of i and will start their consecutive days off on day h and will also take day m off as part of their tour schedule. Note that $Z_{kihm}$ is defined for $m \neq h$, $(h+1)$, for tours requiring a minimum of two consecutive days off, in order to avoid infeasible days off schedules.

Constraint (19) ensures that each agent assigned to tour k receives exactly $r_k$ additional days off. If for tour k, a maximum of $(2+r_k)$ days-off with a minimum of 2 consecutive days-off, this can be formulated by simply modifying constraint (19) as a greater than or equal to type constraint (that is, the term on the left side of (19) is greater than or equal to the term on the right side).

Constraints (19) and (20) ensure that $r_k$ different days are scheduled as non-work days for every agent on days other than their consecutive days off. In constraints (15-18), agents who are off on day h due to their consecutive days-off schedule as well as the agents who are off due to their additional days off schedule are subtracted from the total number of agents scheduled.

When a scheduling environment involves only tour types not requiring any consecutive days off, that is equivalent to requiring a minimum of one "consecutive" day off. In this case, the present invention extends MILP model by removing $Z_{kihl}$ variables from all constraints, and dropping constraints (19) and (20). $Y_{kih}$ is now defined as the number of agents assigned to tour k with a daily start time of i who will take day h off. Note that only $Y_{kih}$ will be in constraints (15-18) instead of both $Y_{kih}$ and $Y_{ki(h-1)}$ since the tour types considered do not require consecutive days off. The MILP model is now stated as follows:

Minimize $$\Sigma_{k \in K} \Sigma_{i \in Ik} C_{ki} X_{ki} \quad (24)$$

Subjec to $$\Sigma_{k \in K} \Sigma_{i \in Ik} a_{kiht} X_{ki} - \Sigma_{k \in K} \Sigma_{i \in Ik} a_{kiht} Y_{kih} -$$
$$\Sigma_{k \in K} \Sigma_{i \in T1kht} U_{kiht} - \Sigma_{k \in K} \Sigma_{i \in T2kht} (W_{kiht} + W_{kih(t-1)}) -$$
$$\Sigma_{k \in K} \Sigma_{i \in T3kht} V_{kiht} \geq b_{ht}, \, t \in T_h, \, h=1, \ldots, 7, \quad (25)$$

$$X_{ki} - Y_{kih} = \Sigma_{t \in B1kih} U_{kiht}, \, i \in I_k, \, k \in K, \, h=1, \ldots, 7, \quad (26)$$

$$X_{ki} - Y_{kih} = \Sigma_{t \in B2kih} W_{kiht}, \, i \in I_k, \, k \in K, \, h=1, \ldots, 7, \quad (27)$$

$$X_{ki} - Y_{kih} = \Sigma_{t \in B3kih} V_{kiht}, \, i \in I_k, \, k \in K, \, h=1, \ldots, 7, \quad (28)$$

$$r_k X_{ki} = \Sigma_h Y_{kih}, \, i \in I_k, \, k \in K, \quad (29)$$

$$\Sigma_{i \in Ik} X_{ki} \leq D_k^{max}, \, k \in K, \quad (30)$$

$Y_{ki}$, $Y_{kih}$, $U_{kiht}$, $W_{kiht}$, and $V_{kiht} \geq 0$ and integer for all k, i, h, and t. (31)

where $r_k$ is now defined as the number of days-off an agent assigned to tour k receives.

A tour is said to have a fixed day off if every agent assigned that tour will be off on the same day. For example, a contact center may close on Sundays. In this case, all agents will receive a day off on Sunday. The present invention extends the MILP model by setting the days-off variables for the fixed days off equal to the number of agent assigned to that tour. For example, if tour k requires two consecutive days off, and day h is an off day for all agents assigned to this tour, then $$X_{ki} = Y_{kih} + Y_{ki(h-1)}, \, i \in I_k, \quad (32)$$

And if tour k doesn't require consecutive days off, and day h is an off day for all agents assigned to this tour, then $$X_{ki} = Y_{kih}, \, i \in I_k. \quad (33)$$

If operating hours are shorter for certain days (e.g. regular hours of 5:00am to 10:00pm with Saturday operating hours of 5:00am to 4:00pm) for a tour or a contact center, the present invention extends the MILP model by formulating each such tour as consisting of two tours with identical work rules except for their start times as follows: (i) tour 1 includes the start times for which the latest daily shift completion time not exceeding the operating hours for the early closure day, and (ii) tour 2 has the start times not covered by tour group 1 (ending after closure on the early closure day) and has a fixed day off on the early closure day to not to schedule any agent to work on those days.

A scheduling environment can have any combination of the extensions and tour types discussed above. The MILP model of the present invention can be extended to formulate these scheduling environments by combining various extensions of the constraints and objective function together with the definitions of decision variables and parameters disclosed above.

Workforce Scheduling with Tours not Requiring Consistent Daily Start Time and Shift Length in a Single Skill Environment To facilitate the discussion and notation, the scheduling environment described before the disclosure of MILP model (1-8) is considered again. The present invention also extends the MILP model to tours not requiring consistent daily shift start times and same daily shift length requirements. For these tours, shift start time as well as shift duration for an agent may vary from one day to another.

Assume that the scheduling environment involves only tours not requiring consistent daily start time and shift length. Let QK be the set of all such tour types. Assume that agents assigned to tour type k can start at any one of a set of predetermined start times given in $QI_k$. Let the daily shift lengths allowed for tour type k be $F_k$. $F_k$ may also change from one day to another. Note that tour k has a minimum weekly work limit specified by the shortest shift in $F_k$, and a maximum weekly work limit specified by the longest shift in $F_k$. The daily shift start times should not allow for back-to-back shift schedules for agents without allowing enough time for rest. Thus, the latest start time for a tour plus the length of the longest daily shift type are not allowed to exceed 24 hours minus the desired minimum rest period between consecutive daily shifts. To prevent this for a tour type, the present invention creates separate tour types each with start times allowing a minimum required time between the latest possible end of a shift on one day and the earliest possible start of a shift on the following day.

Moreover, assume that the maximum number of agents available to assign to tour k is $QD_k^{max}$. Let $QX_{knhi}$ be the number of agents assigned to tour k and shift length n with a starting of period i on day h. Define daily break variables $QU_{kniht}$, $QW_{kniht}$ and $QV_{kniht}$ as the numbers of agents assigned to tour k and shift length n with a daily start time of i and starting their first relief, lunch and second relief breaks in period t on day h, respectively. Depending on the shift length, some of the breaks may not be provided. This case is formulated in the MILP model as disclosed before for tours with more/fewer daily breaks. Daily relief and lunch breaks must start and end within the break windows specified for them. Let $QB1_{knih}$, $QB2_{knih}$ and $QB3_{knih}$ be the sets of planning periods on day h during which an employee assigned to tour k and shift length n with a daily start time of i may start his/her first relief, lunch and second relief break and complete within the time windows specified for these breaks, respectively. Break variables $QU_{knih(t1)}$, $QW_{knih(t2)}$ and $QV_{knih(t3)}$ are defined for $t1 \in QB1_{knih}$, $t2 \in QB2_{knih}$, and $t3 \in QB3_{knih}$, respectively. Further, let $QT1_{knht}$, $QT2_{knht}$ and $QT3_{knht}$ be the sets of start times for shift length n for tour k for which period t on day h is a first relief, lunch, and second relief start period, respectively. Let $a_{kniht}$ be equal to one if period t on day h is in the shift span (that is, a work or a break period) of agents assigned to tour k who have the start time of i and shift length n on day h, and zero otherwise. A work pattern in this case is a string of zeros and ones indicating work days (=1) and non-work days (=0) scheduled for agents assigned to this work pattern. All possible work patterns for a week are shown in FIG. 3 Let the set of all allowed work and non-work day patterns for the agents assigned to tour k be $QL_k$. Only the work patterns in FIG. 3 satisfying the work and non-work day rules specified for tour k are included in $QL_k$ (e.g. a minimum of two consecutive days off no work on Sunday, etc.). A work pattern in this case specifies work and non-work days explicitly. Define the days-off pattern variable $Q_{k1}$ as the number of agents assigned to tour k with a work pattern of 1. Let $A_{kIh}$ be equal to one if day h is a work day for agents assigned to work pattern 1 of tour k, and zero otherwise.

Let $C_{k1}$ be the weekly "fixed" cost (e.g. benefits, etc.) of assigning an agent to tour k with work pattern of 1, $1 \in QL_k$, and $k \in QK$. Let $c_{kni}$ be the daily wage paid to agents assigned to tour type k with a daily shift length of n and start time of i. Finally, let $b_{ht}$ be the number of agents required in period t on day h to deliver the desired service level to customers. The present invention extends the MILP model to this scheduling environment as follows.

Minimize $$\Sigma_{k \in QK} \Sigma_{1 \in QLk} C_{k1} Q_{k1} + \Sigma_{k \in QK} \Sigma_{n \in Fk} \Sigma_h \Sigma_{i \in QIk} c_{kni} QX_{knhi} \quad (34)$$

Subjec to $$\Sigma_{k \in QK} \Sigma_{n \in Fk} \Sigma_{i \in QIk} a_{kniht} QX_{knhi} - \\ \Sigma_{k \in QK} \Sigma_{nsFk} \Sigma_{i \in QT1knht} QU_{kniht} - \\ \Sigma_{k \in QK} \Sigma_{n \in Fk} \Sigma_{i \in QT2knht} (QW_{kniht} + W_{knih(t-1)}) - \\ \Sigma_{k \in QK} \Sigma_{n \in Fk} \Sigma_{i \in QT3knht} QV_{kniht} \geq b_{ht}, \quad t \in T_h, \\ h=1,\ldots,7, \quad (35)$$

$$QX_{knhi} = \Sigma_{t \in QB1knih} QU_{kniht}, \quad n \in F_k, \; i \in QI_k, \; k \in QK, \; h=1,\ldots,7, \quad (36)$$

$$QX_{knhi} = \Sigma_{t \in QB2knih} QW_{kniht}, \quad n \in F_k, \; i \in QI_k, \; k \in QK, \; h=1,\ldots,7, \quad (37)$$

$$QX_{knhi} = \Sigma_{t \in QB3knih} QV_{kniht}, \quad n \in F_k, \; i \in QI_k, \; k \in QK, \; h=1,\ldots,7, \quad (38)$$

$$\Sigma_{1 \in QLk} A_{k1h} Q_{k1} = \Sigma_{n \in Fk} \Sigma_{i \in Ik} QX_{knhi}, \; k \in QK, \; h=1,\ldots,7, \quad (39)$$

$$\Sigma_{1 \in QLk} Q_{k1} \leq QD_k^{max}, \; k \in QK, \quad (40)$$

$QX_{knhi}, Q_{k1}, QU_{kniht}, QW_{kniht},$ and $QV_{kniht} \geq 0$ and integer for all $k, n, i, h,$ and $t$. $(41)$ Expression (34) above is the objective function that minimizes the total "fixed" cost of assigning agents to tours with various feasible work patterns plus the total wages paid to agents. Constraint (35) ensures that the total number of agents assigned to various tours and shift lengths, and available in period t on day h minus the number of agents who are at work on day h but taking their first relief (second term on the left side of (35)), lunch (third term on the left side of (35)), and second relief (four term on the left side of (35)) in period t on day h is sufficient to meet the agent requirements in that period. Break constraints (36-38) ensure that all required breaks are scheduled for each agent who is assigned to tour k. These constraints as well as the break variables are defined only for valid breaks for a shift length. Constraint (39) ensures that the number of shifts scheduled on day h is equal to the number of agents who work on that day based on the scheduled work patterns. Constraint (40) restricts the total number of agents assigned to different feasible work patterns of tour type k to be less than or equal to the total number of agents available to assign to this tour. This constraint can easily be modified to limit the number of agents that can be assigned to a set of tours. Finally, constraint (41) restricts the work pattern, daily shift, and break variables to nonnegative integers to avoid negative values and/or fractional agent schedules.

Extensions of MILP Model (34-41)

Objective function (34) can be easily reformulated to minimize the total amount of agent time scheduled (or paid agent time) by setting $C_{k1}$ equal to scheduled time (or paid agent time) per agent assigned to tour k and work pattern 1, $1 \in QL_k$, and $k \in QK$. Similarly, if agents rate their most preferred, second most preferred, etc., tours using a rating system, these ratings for various tours and work patterns can be aggregated and used in the objective value to maximize agent preference in scheduling tours and work patterns. In order to not to schedule redundant tours and increase agent costs unnecessarily, rating system should assign the lowest value to the most preferred tour, and next value higher to the second most preferred tour, etc. Consequently, the objective function will remain as of minimization type to the maximize agent preference.

The MILP model can be easily modified to develop optimal schedules when there are not enough agents to meet the agent requirements in all periods (i.e when there are going to be agent shortages in some periods). In this case, objective function (34) is modified as follows:

Minimize $$\Sigma_{1 \in QLk} \Sigma_{k \in QK} C_{k1} Q_{k1} + \Sigma_{k \in QK} \Sigma_{n \in Fk} \Sigma_h \Sigma_{i \in QIk} c_{kni} QX_{knhi} + \\ \Sigma_{t \in QTh} \Sigma_h P_{ht} S_{ht} \quad (42)$$

Constraint (35) is then formulated by adding $O_{ht}$ for overstaffing and $S_{ht}$ for shortage to its left hand side as follows:

$$\Sigma_{k \in QK} \Sigma_{n \in Fk} \Sigma_{i \in Qik} a_{kniht} QX_{knhi} - \\ \Sigma_{k \in QK} \Sigma_{n \in Fk} \Sigma_{i \in QT1knht} QU_{kniht} - \\ \Sigma_{k \in QK} \Sigma_{n \in Fk} \Sigma_{i \in QT2knht} (QW_{kniht} + QW_{knih(t-1)}) - \\ \Sigma_{k \in QK} \Sigma_{n \in Fk} \Sigma_{i \in QT3knht} QV_{kniht} + S_{ht} - O_{ht} \geq b_{ht}, \; t \in T_h, \\ h=1,\ldots,7, \quad (43)$$

$S_{ht}, O_{ht} \geq 0$, for all $t \in QT_h$ and $h$. $(44)$

If a certain amount of overstaffing is needed for other tasks (e.g. to answer email or fax based contacts), it can be assured by restricting the overstaffing to be greater than or equal to the desired level $f_{ht}$.

$$\Sigma_{t \in QT} O_{ht} \geq f_{ht}, \; t \in T_h, \; h=1,\ldots,7, \quad (45)$$

If up to a certain amount of understaffing staffing is tolerable (e.g. to see if the total cost can be reduced), this can be achieved by adding a similar constraint:

$$\Sigma_{t \in QTh} S_{ht} \geq d_{ht}, \; t \in T_h, \; h=1,\ldots,7, \quad (46)$$

where $d_{ht}$ is the minimum overtime desired on day h. Note that (45) and (46) can easily modified to impose limits for a specific period(s) on day h.

This case is similar to one of the cases discussed earlier for formulation (1-8). Constraints (2-5) and break variables in (1-8) have the same structure with constraints (35-38) and break variables. In both cases, the number of daily breaks scheduled is equal to the number of agents assigned to a shift and working that day. Thus, the existence of non-consistent daily start times and shift lengths doesn't affect the way breaks are scheduled in the model. Consequently, tours with more breaks or longer breaks can be modeled as disclosed before for formulation (1-8).

Since the valid work patterns are determined in advance in formulating (34-41), the minimum, maximum, and exact number of consecutive days off and/or total number of days off requirements for a tour type can be easily included in formulation (34-41). All possible work patterns are shown in FIG. 3. All feasible work patterns satisfying the days-off rules for tour k, k∈QK, are then identified from this list and included in $QL_k$. Their coefficients $A_{k1h}$ are included in constraint (39).

If a tour type has fixed days off for all agents assigned to it then all feasible work patterns selected for that tour should have a non-work day on that day. To reduce the size of the formulation, shift and break variables for the fixed days off as well as associated break constraints (36-38) are excluded from formulation (34-41).

If working hours are shorter on certain days for a tour or a contact center, the present invention extends the MILP model by excluding the daily shift variables that has a late start time resulting an end time after the early closure time for that tour or center. Break variables as well as break constraints (34-41) associated with these shift variables are excluded.

Workforce Scheduling with Tours Requiring Both Consistent Daily Start Times and Shift Lengths, and Non-Consistent Start Times and Shift Lengths in a Single Skill Environment A workforce scheduling environment may include tours with and without consistent daily start time and shift length requirements discussed earlier. The present invention extends the MILP model to this type of workforce scheduling environment in two ways. First, even though formulation (34-41) is disclosed earlier for scheduling environments involving only tours not requiring consistent daily start times and shift length, it is extended to model such tours with a slight modification as follows; If a tour requires consistent daily start times and shift lengths, then each daily start time for this tour type represents a pseudo-tour type that has the same start time and shift length on all days. Thus, a tour that can start every 30 minutes in a 7-day-a-week-and-24-hour-a-day operation will have 48 (for 48 daily start time) pseudo tour types. Each pseudo tour k has only one daily start time in the daily start time set $QI_k$. Consequently, formulation (34-41) will have work pattern variables $Q_{k1}$, and one daily shift variable $QX_{khi}$, and the associated daily break variables for that shifts for tour k, and day h=1, . . . ,7, for each such pseudo tour.

Moreover, if a tour has multiple shift lengths but doesn't allow varying daily shift start times, the present invention extends the MILP model by introducing pseudo tour types (one per daily start type) and formulating the shift and work pattern variables as in formulation (34-41) with daily shift lengths in $F_k$. This way both consistent daily start time requirement and availability of multiple daily shift lengths are included in the MILP model.

Another way that the present invention extends the MILP model is to merge formulations (1-8) and (34-41) for this type of scheduling environments to obtain optimal schedules. To distinguish cost parameters, $Cx^j_{ki}$ is introduced as the cost of assigning an agent to $X_{ki}$. Using the definitions of the parameters and variables given for formulations (1-8) and (34-41), merging the objective functions (1) and (34) and demand constraints (2) and (35), and including the necessary break and days-off constraints from formulations (1-8) and (34-41), the present invention extends the MILP model for a scheduling environment involving both consistent and non-consistent shift start times and shift lengths as follows:

Minimize $$\Sigma_{k \in K} \Sigma_{i \in Ik} Cx_{ki} X_{ki} + \Sigma_{k \in QK} \Sigma_{1 \in QLk} C_{k1} Q_{k1} + \Sigma_{k \in QK} \Sigma_{n \in Fk} \Sigma_h \Sigma_{i \in QIk} c_{kni} QX_{knhi} \quad (47)$$

Subject to $$\Sigma_{k \in K} \Sigma_{i \in Ik} a_{kihr} X_{ki} - \Sigma_{k \in K} \Sigma_{i \in Ik} a_{kiht} (Y_{kih} + Y_{ki(h-1)}) - \Sigma_{k \in K} \Sigma_{i \in T1kht} U_{kiht} - \Sigma_{k \in K} \Sigma_{i \in T2kht} (W_{kiht} + W_{kih(t-1)}) - \Sigma_{k \in K} \Sigma_{i \in T3kht} V_{kiht} + \Sigma_{k \in QK} \Sigma_{n \in Fk} \Sigma_{i \in QIk} a_{kniht} QX_{kniht} - \Sigma_{k \in QK} \Sigma_{n \in Fk} \Sigma_{i \in QT1knht} QU_{kniht} - \Sigma_{k \in QK} \Sigma_{n \in Fk} \Sigma_{i \in QT2knht} (QW_{kniht} + QW_{knih(t-1)}) - \Sigma_{k \in QK} \Sigma_{n \in Fk} \Sigma_{i \in QT3knht} QV_{kniht} \geq b_{ht}, t \in T_h, h=1,\ldots,7 \quad (48)$$

$$X_{ki} - Y_{kih} - Y_{ki(h-1)} = \Sigma_{t \in B1kih} U_{kiht}, i \in I_k, k \in K, h=1,\ldots,7, \quad (49)$$

$$X_{ki} - Y_{kih} - Y_{ki(h-1)} = \Sigma_{t \in B2kih} W_{kiht}, i \in I_k, k \in K, h=1,\ldots,7, \quad (50)$$

$$X_{ki} - Y_{kih} - Y_{ki(h-1)} = \Sigma_{t \in B3kih} V_{kiht}, i \in I_k, k \in K, h=1,\ldots,7, \quad (51)$$

$$X_{ki} = \Sigma_h Y_{kih}, i \in I_k, k \in K, \quad (52)$$

$$QX_{knhi} = \Sigma_{t \in QB1knih} QU_{kniht}, n \in Fk, i \in QI_k, k \in QK, h=1,\ldots,7, \quad (53)$$

$$QX_{knhi} = \Sigma_{t \in QB2knih} QW_{kniht}, n \in Fk, i \in QI_k, k \in QK, h=1,\ldots,7, \quad (54)$$

$$QX_{knhi} = \Sigma_{t \in QB3knih} QV_{kniht}, n \in Fk, i \in QI_k, k \in QK, h=1,\ldots,7, \quad (55)$$

$$\Sigma_{1 \in QLk} A_{k1h} Q_{k1} = \Sigma_{n \in Fk} \Sigma_{i \in Ik} QX_{knhi}, k \in QK, h=1,\ldots,7, \quad (56)$$

$$\Sigma_{i \in Ik} X_{ki} \leq D_k^{max}, k \in K, \quad (57)$$

$$\Sigma_{1 \in QLk} Q_{k1} \leq QD_k^{max}, k \in QK, \quad (58)$$

$X_{ki}$, $Y_{kih}$, $QX_{knhi}$, $Q_{k1}$, $U_{kiht}$, $W_{kiht}$, and $V_{kiht}$, $QU_{kniht}$, $QW_{kniht}$, and $QV_{kniht} \geq 0$ and integer for all k, n, i, h, and t, (59)

where objective function (47) combines objectives functions (1) and (34), constraint (48) combines agent, break, and days-off variables specifying agent availability in a period from constraints (2) and (35), constraints (49-51) are the break balance constraints for the tours requiring consistent daily shift start times and shift lengths, constraint (52) ensures that sufficient number of days-off are scheduled for the agents assigned to tours requiring consistent daily shift start times and shift lengths, constraints (53-55) ensure that sufficient number of first, lunch, and second relief breaks are scheduled for the agents assigned to tours not requiring consistent daily shift start times and shift lengths, constraint (56) ensures that the number of shifts scheduled on a given day is equal to the number agents who are assigned to work on that day by the work patterns scheduled, constraints (57) and (58) ensure that the numbers of agents assigned to various tours requiring consistent or non-consistent daily shift start times and shift lengths don't exceed the limits on the agent availability for these tours. Finally, constraint (59) restricts the tour, days-off, daily shift, work pattern, and break variables to nonnegative integers to avoid negative values and/or fractional agent schedules.

Depending on the scheduling environment and its tour and shift requirements, the present invention extends the MILP model by merging formulations (1-8), (14-23), (24-31), (34-41) or any extensions of these as disclosed before in a manner similar to formulation (47-59) above. It should be clear to those skilled in the art that the specific embodiments and the MILP model disclosed above can be readily utilized as a basis and extended to other scheduling environments involving the types of tours considered in formulations (1-8), (14-23), (24-31), and (34-41), and their variations without departing from the scope of the invention.

Workforce Scheduling in a Skills Based Environment

The present invention extends the MILP model to scheduling environments involving multiple agent skill groups, agent work groups, and multiple contact types requiring different agent skills. An agent skill group contains agents with the same skill sets and proficiency levels (also referred to as "skill levels"). Let R be the set of different contact types with known agent requirements in each period t and day h. Let the number of agents with qualified skills for contact type r∈R required in period t on day h be $b^r_{ht}$. Suppose now that there are a number of agent skill groups j∈J, each with a unique set of skills. Agent requirements should reflect the multi-skill efficiency expected in a skills-based routing environment due to agents with multiple skills and, depending on the scheduling environment, may be specified for skill groups rather than contact types. Let the set of contact types that skill group j is qualified to provide service be Nj, j∈J. A contact type may be served by multiple agent groups. Let the set of skill groups that can service contact type r be $M^r$.

The present invention extends the MILP model for skills based scheduling by formulating the agent assignment to contact types, and contact type based agent requirements fulfillment in separate constraints. To facilitate the description, consider formulation (34-41) and constraint (35). Further, consider the availability of agents from group j. The number of agents that are available from group j in period t on day h is equal to the number of agents scheduled to work on day h minus the number of agents taking a relief or lunch break in period t. Let $G^{jr}_{ht}$ be the number of agents from skill group j allocated to serve type r contacts, where r∈$N_j$, and j∈$M^r$. These variables are also referred to as "skill allocation variables". Thus, $$\Sigma_{k \in QKj}\Sigma_{n \in Fk}\Sigma_{i \in QIk} a_{knih t} QX^j_{knhi} - \Sigma_{k-QKj}\Sigma_{n \in Fk}\Sigma_{i \in QT1knht} QU^j_{knih t} - \Sigma_{k \in QKj}\Sigma_{n \in Fk}\Sigma_{i \in QT2knht}(QW^j_{knih t} + QW^j_{knih(t-1)}) - \Sigma_{k \in QKj}\Sigma_{n \in Fk}\Sigma_{i \in QT3knht} QV^j_{knih t} - \Sigma_{r \in Nj} G^{jr}_{ht} = 0, j \in J, t \in T_h, h=1, \ldots, 7, \quad (61)$$

The first term on the left side of (61) is the number of agents from group j scheduled in period t on day h. The second through fourth terms on the left side are the numbers of agents who are scheduled to be on a relief or lunch break during this period. Thus, the difference is equal to the number of agents who are scheduled and working during period t on day h. Finally, the fifth term is the sum the numbers of agents allocated to various contact types in $N_j$.

The present invention extends the MILP model into the skills based scheduling environment in two different ways. First approach involves merging formulations (14-23) and (34-41). Consider constraints (15) and (35). In the skills based scheduling environment, the right sides of these two constraints are merged as follows:

$$f^j_{ht}(X, Y, Z, U, W, V, QX, Q, QU, QW, QV) = \Sigma_{k \in Kj}\Sigma_{i \in Ik} a_{kiht} X^j_{ki} - \Sigma_{k \in Kj}\Sigma_{i \in Ik} a_{kiht}(Y^j_{kih} + Y^j_{ki(h-1)}) - \Sigma_{k \in Kj}\Sigma_{m \neq h(h-1)} a_{kih t} Z^j_{kimh} - \Sigma_{k \in Kj}\Sigma_{i \in T1kht} U^j_{kih t} - \Sigma_{k \in Kj}\Sigma_{i \in T2kht}(QW^j_{kih t} + QW^j_{kih(t-1)}) - \Sigma_{k \in Kj}\Sigma_{i \in T3kht} QV^j_{kih t} + \Sigma_{k \in QKj}\Sigma_{n \in Fk}\Sigma_{i \in QIk} a_{knih t} QX^j_{knhi} - \Sigma_{k \in QKj}\Sigma_{n \in Fk}\Sigma_{i \in QT1knht} QU^j_{knih t} - \Sigma_{k \in QKj}\Sigma_{n \in Fk}\Sigma_{i \in QT2knht}(QW^j_{knih t} + QW^j_{knih(t-1)}) - \Sigma_{k \in QKj}\Sigma_{n \in Fk}\Sigma_{i \in QT3knht} QV^j_{knih t} \quad j \in J, t \in T_h, h=1, \ldots, 7, \quad (62)$$

The terms on the right hand side of (62) represented by $f^j_{ht}$(X, Y, Z, U, W, V, QX, Q, QU, QW, QV) give the number of agents from group j assigned to various tours (with and without consistent start time and length) and are available in period t on day h. The notation introduced for (1-61) is now extended to distinguish agent skill groups. For example, X={$X^j_{ki}$: i∈$I_k$, k∈$K_j$, h=1, . . . ,7} where $X^j_{ki}$ is as defined before except it now represents the number of agents from group j assigned to tour k with a daily start time of i. The sets Y, Z, U, W, V, QX, Q, QU, QW, and QV are defined similar to the set X to include the respective variables for the agent groups in J. Constraint (61) is now extended to the skills based scheduling MILP model of the present invention as follows.

$$f^j_{ht}(X, Y, Z, U, W, V, QX, Q, QU, QW, QV) - \Sigma_{r \in Nj} G^{jr}_{ht} = 0, j=1, \ldots, n, t \in T_h, h=1, \ldots, 7, \quad (63)$$

Given the agent allocation $G^{jr}_{ht}$ in every period and day for different contact types, agent requirement constraints for contact type r are formulated in the MILP model as follows.

$$\Sigma_{j \in M^r} e^{jr} G^{jr}_{ht} \geq b^r_{ht}, r \in R, t \in T_h, h=1, \ldots, 7, \quad (64)$$

where $e^{jr}$ is the relative efficiency of an agent from agent group j in serving contact type r with respect to an agent whose primary skill (highest proficiency level) is serving contact type r, $e^{jr} \in [0, 1]$. For instance, if $e^{jr}=1$, agent group j is equally efficient, and if $e^{jr}=0.75$, agents in group j are 75% efficient with respect to an agent whose primary skill is serving contact type r. Values of $G^{jr}_{ht}$ variables do not have to be integer.

Variable definitions presented before are modified to include agent group j∈J as a superscript in all variables. To schedule breaks and days off for different agent groups, constraints (16-18) and (36-38), except for variable definitions for different agent skill groups, remain the same since the agent allocation does not affect the break and days-off scheduling constraints. Objective functions (14) and (34) are merged and modified to include potential wage differentials for different agent groups. The MILP model of the present invention is now disclosed below.

Minimize $$\Sigma_{j \in J}\Sigma_{i \in Ik}\Sigma_{k \in Kj} Cx^j_{ki} X^j_{ki} + \Sigma_{j \in J}\Sigma_{l \in QLk}\Sigma_{k \in QKj} C^j_{k1} Q^j_{k1} + \Sigma_{j \in J}\Sigma_{k \in QKj}\Sigma_{n \in Fk}\Sigma_h \Sigma_{i \in QIk} d^j_{kni} QX^j_{knhi} \quad (65)$$

Subject to $$\Sigma_{j \in M^r} e^{jr} G^{jr}_{ht} \geq b^r_{ht}, r \in R, t \in T_h, h=1, \ldots, 7, \quad (66)$$

$$f^j_{ht}(X, Y, Z, U, W, V, QX, Q, QU, QW, QV) - \Sigma_{r \in Nj} G^{jr}_{ht}=0, j \in J, t \in T_h, h=1, \ldots, 7, \quad (67)$$

$$X^j_{ki} - Y^j_{kih} - Y^j_{ki(h-1)} - \Sigma_{m \neq h,(h-1)} Z^j_{kimh} = \Sigma_{t \in B1kih} U^j_{kih t} \quad j \in J, i \in I_k, k \in K_j, h=1, \ldots, 7, \quad (68)$$

$$X^j_{ki} - Y^j_{kih} - Y^j_{ki(h-1)} - \Sigma_{m \neq h,(h-1)} Z^j_{kimh} = \Sigma_{t \in B2kih} W^j_{kih t} \quad j \in J, i \in I_k, k \in K_j, h=1, \ldots, 7, \quad (69)$$

$$X^j_{ki} - Y^j_{kih} - Y^j_{ki(h-1)} - \Sigma_{m \neq h,(h-1)} Z^j_{kimh} = \Sigma_{t \in B3kih} V^j_{kih t} \quad j \in J, i \in I_k, k \in K_j, h=1, \ldots, 7, \quad (70)$$

$$r_k Y^j_{kih} = \Sigma_{l=h,(h+1)} Z^j_{kih 1}, j \in J, i \in I_k, k \in K_j, h=1, \ldots, 7, \quad (71)$$

$$Z^j_{kihm} \leq Y^j_{kih}, j \in J, i \in I_k, k \in K_j, h=1, \ldots, 7, m \neq h, (h+1) \quad (72)$$

$$X^j_{ki} = \Sigma_h Y^j_{kih}, j \in J, i \in I_k, k \in K_j, \quad (73)$$

$$QX^j_{knhi} = \Sigma_{t \in QB1knih} QU^j_{knih t}, j \in J, n \in F_k, i \in QI_k, k \in QK_j, h=1, \ldots, 7, \quad (74)$$

$$QX^j_{knhi} = \Sigma_{t \in QB2knih} QW^j_{knih t}, j \in J, n \in F_k, i \in QI_k, k \in QK_j, h=1, \ldots, 7, \quad (75)$$

$QX^j_{knhi} = \Sigma_{t \in QB3knih} QV^j_{kniht}, j \in J, n \in F_k, i \in QI_k, k \in QK_j,$
    $h=1, \ldots, 7,$ (76)

$\Sigma_{l \in QLk} A_{k1h} Q^j_{k1} = \Sigma_{n \in Fk} \Sigma_{i \in Ik} QX^j_{knhi}, \quad j \in J, \quad k \in QK_j, \quad h = 1, \ldots, 7,$ (77)

$\Sigma_{i \in I} y^j_{ki} \leq D^{j \, max}_k, j \in J, k \in K_j,$ (78)

$\Sigma_{l \in QLk} Q^j_{k1} \leq QD^{j \, max}_k, j \in J, k \in QK_j,$ (79)

$X^j_{ki}, Y^j_{kih}, Z^j_{kihn}, U^j_{kiht}, W^j_{kiht}, V^j_{kiht}, QX^j_{knhi}, Q^j_{k1},$
    $QU^j_{kniht}, QW^j_{kniht} \geq 0$ and integer for all $j, k, n$ $i$,
    $h$, and $t$, and $G^{jr}_{ht} \geq 0$ for all $j, r, h$, and $t$. (80)

where $f^j_{ht}(X, Y, Z, U, W, V, QX, Q, QU, QW, QV)$ is as defined in equation (62) above.

$G^{jr}_{ht}$ in formulation (65-80) above doesn't have to be integer even though it represents the number of agents from group j allocated to serve type r contacts. Hence, formulation (65-80) is a Mixed Integer Programming (MILP) formulation involving both integer and continuous variables.

Note that MILP formulation (65-80) may also be modified to have multiple daily shift lengths by modifying $f^j_{ht}$ to include the set of shift lengths $F_k$, and appropriate $a_{kiht}$ coefficients for $X^j_{ki}$, i∈I, k∈$K_j$, in (62).

In order to prevent the notation becoming more taxing, the MILP model of the present invention for optimal workforce scheduling in a skills based scheduling environment is presented for a combination of the scheduling environments disclosed before for formulations (15-23) and (34-41). Depending on the scheduling environment and its tour and shift requirements, the present invention extends the MILP model by merging formulations (1-8), (14-23), (24-31), (34-41) or any extension of these as disclosed before in a manner similar to the MILP model presented above. It should be clear to those skilled in the art that the specific embodiments and the MILP model disclosed above can be readily utilized as a basis and extended to other scheduling environments without departing from the scope of the invention.

The present invention also extends the MILP model to obtain a second formulation by defining pseudo tours for the tours requiring consistent daily shift start times as follows. Consider a tour type, say tour k, k∈$K_j$, available for skill group j. Set $K_j$ contains the valid tour types for skill group j that require consistent daily shift start times. Constraints (68-73), (78), and six terms on the right side of (62) involving variables $X^j_{ki}, Y^j_{kih}, Z^j_{kih}, U^j_{kiht}, W^j_{kiht}$, and $V^j_{kiht}$ specify the break placement and days off scheduling requirements and agent availability for tours in $K_j$. The present invention extends the MILP model for the second formulation by first considering all valid work patterns given in FIG. 3 and identifying the patterns satisfying constraints (71-73) for k∈$K_j$. A distinct pseudo tour is then defined for every daily start time specified in $I_k$, k∈$K_j$, with the valid work patterns identified. Let one such pseudo tour be α. Then, α has only one daily start time in $OI_\alpha$ representing one of the daily start times in $I_k$, has the same break placement and days off scheduling requirements with tour k, k∈$K_j$, and has the work patterns in $OL_\alpha$. After these modifications, pseudo tours defined this way are treated like the tours not requiring consistent daily start times and included in the tours set $QK_j$ available for agent skill group j. Since $OI_\alpha$ has only one daily start time, this satisfies the consistent daily shift start time requirement. Also, for tour α, $F_\alpha$ may have more than one shift length specified for tour k, k∈$K_j$. Another way the present invention extends the MILP model is by merging notation used in constraints (68-70) and (74-76), and constraints (78) and (79), and removing the redundant notation and constraints as follows.

Minimize $\Sigma_{j \in J} \Sigma_{l \in QLk} \Sigma_{k \in QKj} C^j_{k1} Q^j_{k1} +$
    $\Sigma_{j \in J} \Sigma_{k \in QKj} \Sigma_{n \in Fk} \Sigma_h \Sigma_{i \in QIk} c^j_{kni} QX^j_{knhi}$ (81)

Subject to $\Sigma_{j \in M_r} e^{jr} G^{jr}_{ht} \geq b^r_{ht}, r \in R, t \in T_h, h=1, \ldots, 7,$ (82)

$f^j_{ht}(QX, Q, QU, QW, QV) - \Sigma_{r \in Nj} G^{jr}_{ht} = 0, j \in J, t \in T_h, h = 1, \ldots, 7,$ (83)

$QX^j_{knhi} = \Sigma_{t \in QB1knih} QU^j_{kniht}, j \in J, n \in Fk, i \in QI_k, k \in QK_j,$
    $h=1, \ldots, 7,$ (84)

$QX^j_{knhi} = \Sigma_{t \in QB2knih} QW^j_{kniht}, j \in J, n \in Fk, i \in QI_k, k \in QK_j,$
    $h=1, \ldots, 7,$ (85)

$QX^j_{knhi} = \Sigma_{t \in QB3knih} QV^j_{kniht}, j \in J, n \in Fk, i \in QI_k, k \in QK_j,$
    $h=1, \ldots, 7,$ (86)

$\Sigma_{l \in QLk} A_{k1h} Q^j_{k1} = \Sigma_{n \in Fk} \Sigma_{i \in QIk} QX^j_{knhi}, \quad j \in J, \quad k \in QK_j, \quad h = 1, \ldots, 7,$ (87)

$\Sigma_{l \in QLk} Q^j_{k1} \leq QD^{j \, max}_k, j \in J, k \in QK_j,$ (88)

$QX^j_{knhi}, Q^j_{k1}, QU^j_{kniht}, QW^j_{kniht},$ and $QV^j_{kniht} \geq 0$ and integer for all $j, k, n, i, h, t$, and $G^{jr}_{ht} \geq 0$ for all $j, r, h$, and $t$. (89)

where $f^j_{ht}(X, U, W, V, QX, Y, Z, Q, QU, QW, QV)$ is now expressed as given below.

$f^j_{ht}(QX, Q, QU, QW,$
    $QV) = \Sigma_{k \in QKj} \Sigma_{n \in Fk} \Sigma_{i \in QIk} a_{kniht} QX^j_{knhi} -$
    $\Sigma_{k \in QKj} \Sigma_{n \in Fk} \Sigma_{i \in QT1knht} QU^j_{kniht} -$
    $\Sigma_{k \in QKj} \Sigma_{n \in Fk} \Sigma_{i \in QT2knht} (QW^j_{kniht} + QW^j_{knih(t-1)}) -$
    $\Sigma_{k \in QKj} \Sigma_{n \in Fk} \Sigma_{i \in QT3knht} QV^j_{kniht} \quad j \in J, \quad t \in T_h, \quad h = 1, \ldots, 7,$ (90)

Extension of formulations (65-80) and (81-89) to the cases discussed in relation to formulations (1-8) and (34-41) is straightforward. For example, it should be clear to those skilled in the art that the information disclosed in relation to formulations (1-8) and (34-41) can be readily utilized as a basis to extend formulations (65-80) and (81-89) of the present invention to the cases involving (i) minimizing scheduled/paid time or maximizing agent preference, (ii) schedule generation when there aren't enough agents (i.e. there are agent shortages in some periods for some contact types), (iii) tours with longer and/or more/less breaks, (iv) fixed days-off, and (v) days with a closure time earlier than the other days. In yet another embodiment, agent requirements may be given for skill group instead of contact types. Let $b^j_{ht}$ be the number of agents from skill group j needed in period t on day h. In this case, constraints (82) and (83) are combined as follows.

$f^j_{ht}(QX, Q, QU, QW, QV) + S^r_{ht} - O^r_{ht} = b^j_{ht}, j \in J, t \in T_h,$
    $h=1, \ldots, 7,$ (91)

With constraint (91) replacing (82) and (83), the MILP formulation (81-89) can be separated into a series MILP formulations, resulting in one MILP formulation for each skill group j, j∈J. Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

Description of the Method for Finding an Optimal Solution of the MILP Model and an Optimal Schedule in a Skills Based Scheduling Environment Formulations (65-80), and (81-89), and their extensions disclosed before can be solved to obtain a global optimal solution in a number of ways. Such a global optimal solution satisfies the necessary and sufficient conditions for optimality of the MILP model of the invention. The solution method of the invention will be discussed in the context of formulations (65-80) and (81-90). However, the solution method of the present invention can also be used to solve optimally formulation (1-8) and its extensions, and formulation (24-31) and its extensions as well as formulation (47-59) disclosed before. Therefore, the scope of the solution method of the invention also includes such MILP models.

The branch and cut (B&C) algorithm is a well known technique for optimally solving MILP formulations such as (65-80), and (81-89) (Wolsey, 1998). A computer program implementing the B&C algorithm can be developed using any programming language or can be obtained from a number of software companies including Ilog, Inc., and Dash Optimization. These providers are also offering their B&C algorithm in the form of a callable library that can be called from an integrated MILP model generator and optimizer module. In either case, the B&C algorithm forms a part of the solution method of the present invention.

The MILP formulation generator ((3) in FIG. 1) of the invention is implemented in a computer program. Given the agent and skills requirements for each planning period $t \in QT_h$, h=1, . . . ,7, and center information regarding agent groups, tours and shift parameters, the MILP formulation generation program develops a formulation (step (11)) of the scheduling problem using the MILP formulations and their extensions (1-89) of the invention disclosed before. To generate a formulation, the MILP formulation generation program calculates the coefficients of various shift, break, days-off, work pattern, overage and underage, agent allocation variables in the respective equations and inequalities of the MILP model of the invention for the scheduling environment considered. This information is used by the MILP formulation generator program to generate data arrays containing the coefficients of the decision variables in every constraint defined for the particular scheduling environment to meet its requirements. These arrays are then passed to the optimizer module (step (12)). It is to be understood that a number of versions of the MILP formulation generation method can be developed for the formulations, and their extensions disclosed above without departing from the scope of the invention.

The optimizer module is a computer program working with the MILP formulation generator program, and uses a B&C algorithm supplemented by the RA algorithm of the invention. The purpose of the RA algorithm is to search for integer feasible solutions for the MILP model generated together with the B&C algorithm. If a sub-problem is infeasible (i.e. the sub-problem has no integer or non-integer solution), or has an integer feasible solution (that is, a solution satisfying all constraints of the model including the integrality constraints for all decision variables), or has a solution that is inferior to the best available lower bound for the optimal integer solution of the MILP model, the B&C algorithm doesn't call the RA algorithm since it can't develop a new or different integer solution. Otherwise, the B&C algorithm calls the RA algorithm after obtaining a non-integer but feasible solution to a node. At each such node (or after every any number of such nodes), using the non-integer solution found by the B&C algorithm to that node, the RA algorithm makes an attempt to find an integer feasible solution to the MILP model of the invention while trying to achieve the best objective value.

The B&C algorithm first solves the continuous version (i.e. Linear Programming (LP) relaxation) of an MILP model (Wolsey, 1998) (step (17)). This node is called node zero (subsequent nodes are numbered sequentially). If the continuous solution thus found is integer feasible and optimal (step (20)), then the optimizer terminates with an optimal solution to the MILP model (step (21)). If this solution is not integer feasible (i.e. if some integer restricted variables have non-integer values), then the B&C algorithm starts creating nodes (sub-problems) by adding constraints on certain decision variables to eliminate non-integer values. In this case, the objective value of the solution of the LP relaxation is a lower bound on the lowest objective value that can ever be achieved for the scheduling environment formulated in the MILP model. That is, no solution to the MILP model can have an objective value better than the lower bound thus obtained. After solving the LP relaxation at node 0, if the solution is a feasible solution to the LP relaxation but violates some integrality constraints (step (22)), the B&C algorithm calls the RA algorithm. If the RA algorithm locates an integer feasible solution, its objective value is saved as the best heuristic objective value, and the integer solution is returned to the B&C algorithm (step (100A)) as the best-known integer solution (if no integer solution is available beforehand). In the subsequent nodes, the RA algorithm of the invention proceeds as outlined below.

Step 23: Obtain the objective value for the best integer solution known from the B&C algorithm. If this value is better than the best heuristic objective value in the RA algorithm, update the best heuristic objective value.

Step 24: Obtain the values of the shift, breaks, days-off, work pattern, and skill allocation variables (X, U, W, V, Y, QX, Q, QU, QW, QV) in the non-integer solution to the node solved from the B&C algorithm.

Step 25: Round the fractional values of all U, W, V, Y, QX, QU, QW, QV, and G variables down (i.e. truncate the fractional values). As for X and Q variables, round these variables down by their fractional parts are less than or equal to 0.50. Keep a list of the variables with a fractional part greater than 0.50. Find the total number of agents assigned to each tour type. Round the variables that had a fractional part greater than 0.50 up, one at a time, if the new value is not violating the maximum agent constraints (e.g. constraints (78-79)). If the maximum agent limit is reached for a tour group, round the remaining variables down even if their fractional parts are greater than 0.50. Compute the agent shortages and excesses in each period for all contact types using the rounded values of decision variables.

Step 26: Compare the days-off variables Y and Z with shift variables X for tours with consistent daily start time and shift length, and daily shift variables QX with work pattern variables Q. If additional days off or daily shifts are needed to satisfy tour requirements, go to step (27). Otherwise, go to (28).

Step 27: Schedule more days off (i.e. increase the values of appropriate days-off variables) for the tours with consistent start times on the days with the lowest maximum per period, or total shortages during a tour's shift span to satisfy days off requirements for every agent currently scheduled. Similarly, schedule daily shifts to have sufficient number of daily shifts scheduled for the tours not requiring consistent daily shift start times on the days and shift start times with the highest maximum per period shortage, or total shortage covered by that shift. Thus, the tour requirements for days off, and daily shifts (e.g. constraints (71-73) and (77)) will be satisfied by these variables.

Step 28: Compare the break variables, U, W, and V with the shift variables X and days-off variables Y, and QX, QU, and QW with daily shift variables QX. If the required number of breaks is scheduled for every tour, go to step (30). Otherwise, go to step (29).

Step 29: If more breaks are scheduled on a day for a tour, unschedule breaks (i.e. decrease the value of appropriate break variables) to have the correct number of breaks scheduled. If fewer than the required number of breaks are scheduled, schedule additional breaks in the periods (contagious if a break is more than one period long within the break window of the respective break) that has the lowest maximum per period shortage, or total shortage (or if no period has shortage, then the highest maximum per period excess, or total excess) to satisfy the break balance requirements (e.g. constraints (68-70) and (74-76).

Step 30: Compute the agent shortages and excesses using the agent allocation variables G for each contact type, planning period, and day.

Step 31: Compute the scheduled agent availability in each period for all agent groups (i.e. $P_{ht}(X, U, W, V, QX, Y, Q, QU, QW, QV)$ in equation (67)). Compare the number of agents available in each agent group j in a planning period, say $t \in T_h$ on day h, with the values of the agent allocation variables G associated with this agent group in planning period t. If the number of agents available to work for agent group j is not equal to the sum of the current values of the agent allocation variables (from step 25) for all contact types in $N_j$ in period t on day h, adjust values of associated allocation variables to meet the requirements by contact types in $N_j$. Prioritize contact types in each period by (i) maximum shortage, (ii) whether this agent group is the only agent group (or the number of agent groups and tour groups) in $M^r$, the set of agent groups that can serve a contact type, (iii) lowest cost per period per agent to meet shortage for a contact type. This allocation process can be carried out in a number of ways. These allocation criteria are implemented in a nested fashion so that if contact types have the same merits as far as criteria (i) is concerned, than the tie is broken by applying criteria (ii), and so on. This process results in a schedule that allocates all agents scheduled. Update period shortages and excesses.

Step 32: The schedule constructed using the non-integer solution found by the B&C algorithm for a node satisfies all constraints (e.g. formulation (65-80)), but may not satisfy the agent and skill requirements (e.g. constraint (66)). If all agent and skill requirements are satisfied in all periods to be scheduled, then go to step 39. Otherwise, go to step 33.

Step 33: If all available agents are scheduled, go to step 34. Otherwise, go to step 37.

Step 34: If a feasible schedule satisfying all agent requirements is found either by the B&C algorithm, or in the earlier calls to the RA algorithm, go to step 35. Otherwise, go to step 36.

Step 35: Discard the current infeasible solution (that is, an integer solution with agent shortages). Stop the RA algorithm, and return control back to the B&C algorithm (step (17)).

Step 36: If an integer feasible solution to the MILP model hasn't been found by the B&C and RA Algorithms at earlier tries, compare the new infeasible solution with the infeasible solution recorded in earlier calls to the RA algorithm, and update the best infeasible solution if the new one has fewer period shortages. If this is node zero, store the infeasible solution if there are no known solution. Stop the RA algorithm, and return back to the B&C algorithm (step (17)).

Step 37: Given the current agent allocations and requirements, find the agent requirement constraints that are not satisfied (i.e. have shortages) for all contact types and periods. Considering all agent groups $j \in J$, and tour types $k \in K_j$ and $k \in QK_j$, find a tour schedule that will reduce the highest number of period shortages per dollar, and schedule the tour with an agent. To specify the tour schedule for the new agent, find a daily shift start time, days-off schedule, and breaks for work days if the tour type requires consistent daily start time, or work pattern daily shift start times, shift lengths, and break times for work days if the tour type doesn't require consistent daily start time and shift length as follows:

37a: For each agent skill group j with available agents (i.e. the number of agents already scheduled in the rounded solution found in step (25) is less than the maximum number of agents available for an agent skill group), consider tour type k that is available for this agent group. If the tour requires consistent daily start time and shift length, that is $k \in K_j$, go to 37b. Otherwise, $k \in QK_j$ and go to 37c.

37b: Consider a daily start times in $V_k$ for tour type k, and all contact types in R. Determine the period with the highest shortage level covered by this tour (referred to as "peak shortage coverage" in the remainder of this document). In order to determine the highest peak shortage coverage by a new agent, allocation of an agent's time should be decided based on the shortages by contact types to maximize this measure. Given the allocation of agent's time, determine also the total number of agent shortage periods (referred to as "total shortage coverage" in the remainder of this document) covered by this tour. All subsequent references to shortages and excesses refer to this allocation of the new agent's time. Consider the days-off schedule for this agent. Schedule the required number of days off on the days with the highest total excess during the tour schedule (or if all days have shortages, then the days with the lowest total shortage). Days-off schedule should adhere to minimum number of consecutive days off as well as fixed days off requirements. Adjust the total shortages covered by this agent. Go to 37d.

37c: Consider a work pattern in $QL_k^j$ for tour type k, and all contact types in R. For the selected work pattern, determine the daily start time for each work day that will result in the highest peak shortage coverage by this tour. In order to determine the maximum shortage coverage by a new agent, allocation of an agent's time should be decided based on the shortages by contact types to maximize this measure. Given the allocation of agent's time, also determine the total number of shortage periods covered by this tour. All subsequent references to shortages and excesses refer to these allocations. Go to 37d.

37d: Consider the work days for the tour identified in 37b or 37c. Schedule the relief and lunch breaks for work days into the periods within the specified break windows with the highest total excess (or, if all periods within a break window has shortages, then, then the periods with the lowest total shortage). Adjust the total shortage covered by this agent.

37e: If tour k requires consistent daily shift start times and lengths, compare the peak shortage covered by tours starting at different times in $V_k$ and find the start time i* with the highest peak shortage covered. If there are ties between two or more start times in $V_k$, select the one with the highest shortage coverage per dollar (total shortage coverage)/$C^j_{ki}$ If tour k does not require consistent daily shift start times and lengths, compare the peak shortage covered by tours with different work patterns in $QL_k^j$ and find the work pattern 1* with the highest peak shortage covered. If there are ties between two or more work patterns in $QL^j_k$ select the one with the highest shortage coverage per dollar $$\frac{\text{(total shortage coverage)}}{(C^j_{kl} + \Sigma_h(\text{number of hours worked on day } h) * c^j_{kni})}$$

37f: If tour k for agent group j is the first tour evaluated, then store the current skill group, tour schedule, and agent allocation as the best ones found so far, and go to step 37a. Otherwise, if the peak shortage covered by tour k is higher than the highest peak shortage covered by any tour and skill group considered so far, update the best skill group, tour schedule, and agent allocation with the current ones. If there is a tie between the current tour schedule and skill group, and the best skill group and tour schedule found so far, select the one with the highest $$\frac{\text{(total shortage coverage)}}{C^j_{ki}},$$

for i when $k \in K_j$, $$\frac{\text{(total shortage coverage)}}{(C^j_{kl} + \Sigma_h(\text{number of hours worked on day } h) * c^j_{kni})},$$

for l when $k \in QK_j$,

Also update the peak shortage covered, and the total shortage coverage for the current tour schedule. Go to 37g if all skill groups and all tours are evaluated. Otherwise, go to 37a.

37g: Add the best tour schedule found in steps 37a-37f to the schedule developed in steps 16-37. Update the values of shift, days-off, break, and agent allocation X, Y, U, W, V, QX, Q, QU, QW, QV, and G variables. Update shortages and excesses using the expanded schedule with the new agent.

Step 38: If there are shortages in any period and contact type, go to step 33. Otherwise, a feasible schedule is found. Go to step 39.

Step 39: Consider the agents scheduled in the expanded schedule. Start with the most known integer solution differs less than a pre-specified percentage from the best lower bound found by the B&C algorithm, (ii) a pre-specified number of sub-problems (e.g. one or more sub-problems) are solved by the B&C and RA algorithms, or (iii) a pre-specified amount of time elapses after locating the first integer feasible solution to the MILP. A solution that is either optimal or satisfying these conditions is referred to as a "terminal" solution. The RA algorithm may also be modified to search for an integer feasible solution to a sub-problem using any of the known heuristics (e.g. Tabu Search, Simulated Annealing, Genetic Search), or to formulate and add Gomory's cuts or other well know cuts (Wolsey, 1998) to sub-problems, change branching direction or priorities in the B&C algorithm. The optimization process outlined here doesn't exclude these extensions.

Once a terminal solution is found, detailed tour schedules for agents can be developed in a number of ways. All such schedules will have the same objective value and, therefore, equally effective. First, work patterns and daily shift start times are specified. Consider a tour requiring consistent daily start times. The days-off scheduled in the solution for this tour are first assigned to individual tours. For example, if, in the terminal solution, tour type 1 has 2 agents from skill group 3 to start daily at 7:00am (that is, the variable $X^3_{1(7:00)}=2$ in formulation (65-80)), initially these 2 agents are scheduled for work on all 7 days in a week. However, since day-off constraints (e.g. constraints (71-73)) ensures sufficient numbers of consecutive and non-consecutive days off for every agent, each of these two agents will get the required number of days-off. Suppose, for instance, each agent assigned to this tour receives only two consecutive days off. Then, in the solution, $\Sigma_h Y^3_{1(7:00)h}=2$. Consequently, each agent will be off on one of these two consecutive days off. Thus, the tour schedules for these two agents now have work and non-work days specified. Similarly, if a tour does not require consistent daily star time and shift length, daily shifts scheduled (including lengths and start times) in the terminal solution by the values of the decision variables are assigned to work patterns specified by the values of the work pattern variables in the terminal solution. Work pattern constraints (e.g. constraint (77)) ensures that a daily shift is scheduled for every agent that will be at work due to the work patterns scheduled in the solution. These daily shifts are assigned to work patterns by following the variable definitions to satisfy tour and shift rules for each tour type. Thus, the weekly tours are stated with off days, work days with daily start times and shift lengths for every agent scheduled in the solution. Break balance constraints (e.g. constraints (68-70) and (74-76)) ensure that one break of each type is scheduled for every agent scheduled to work on a given day. These breaks are assigned to respective tours that have a given day as a work day while making sure that agent group, tour type, the daily start time, shift length and break window associations specified in the variable definitions are followed correctly to satisfy break scheduling requirements. Detailed weekly schedules are then assigned to specific agents based on their preferences, starting with the agent having the highest preference priority (e.g. seniority) to complete the rostering process.

Accordingly, it is to be understood that the embodiments of the invention herein described are merely illustrative of the application of the principles of the invention. It will be clear to one skilled in the art that the above embodiment may be altered or supplemented in many ways without departing from the scope of the invention. Reference herein to details of the illustrated embodiments are not intended to limit the scope of claims, which themselves recite those features regarded as essential to the invention.

What is claimed is:

1. A computer implemented system for developing an optimized workforce schedule for a plurality of agents, each with a combination of defined skills and belonging to a skill group with agents having the same skills, to serve one or more contact types such as telephone calls, email, and other interaction media, a plurality of tour types with defined scheduling rules, located at one or more contact centers each with its own operating hours and time zones, comprising the steps of:

(a) acquiring agent requirements, $b^r_h$, for each contact type, and for each period and day to be scheduled by a computer;

(b) acquiring tour, shift, days-off, and break scheduling rules, agent skill groups, agent availability, and objective criterion to be optimized and its parameters by a computer;

(c) formulating the constraints and objective function of a Mixed Integer Programming (MILP) model with the tour types and associated scheduling rules including consistent and non-consistent daily start time requirements, a plurality of relief and lunch breaks each with a duration of one or more planning periods and a break window during which the break must be started and completed, agent requirements for a plurality of contact types and for each period to be scheduled, a plurality of agent skills and skill groups, agent availability, and agent costs by a computer;

wherein formulating the constraints and objective function of the MILP model comprises:

Minimize $$\Sigma_{j \in J} \Sigma_{1 \in QLk} \Sigma_{k \in QKj} C^j_{k1} Q^j_{k1} + \Sigma_{j \in J} \Sigma_{k \in QKj} \Sigma_{n \in Fk} \Sigma_h \Sigma_{i \in QIk} c^j_{knhi} QX^j_{knhi} + \Sigma_{r \in R} \Sigma_{t \in Th} \Sigma_h P^r_{ht} S^r_{ht} \quad (c1)$$

Subject to $$\Sigma_{j \in M^r} e^{jr} G^{jr}_{ht} + S^r_{ht} - O^r_{ht} = b^r_{ht}, \; r \in R, \; t \in T_h, \; h=1, \ldots, 7, \quad (c2)$$

$$f_{ht}(QX, QU, QW, QV) - \Sigma_{r \in Nj} G^{jr}_{ht} = 0, \; j \in J, \; t \in T_h, \; h=1, \ldots, 7, \quad (c3)$$

$$QX^j_{knhi} = \Sigma_{t \in QB1knih} QU^j_{kniht}, \; j \in J, \; n \in Fk, \; i \in QI_k, \; k \in QK_j, \; h=1, \ldots, 7, \quad (c4)$$

$$QX^j_{knhi} = \Sigma_{t \in QB2knih} QW^j_{kniht}, \; j \in J, \; n \in Fk, \; i \in QI_k, \; k \in QK_j, \; h=1, \ldots, 7, \quad (c5)$$

$$QX^j_{knhi} = \Sigma_{t \in QB3knih} QV^j_{kniht}, \; j \in J, \; n \in Fk, \; i \in QI_k, \; k \in QK_j, \; h=1, \ldots, 7, \quad (c6)$$

$$\Sigma_{1 \in QLk} A_{k1h} Q^j_{k1} = \Sigma_{n \in Fk} \Sigma_{i \in QIk} QX^j_{knhi}, \; j \in J, \; k \in QK_j, \; h=1, \ldots, 7, \quad (c7)$$

$$\Sigma_{1 \in QLk} Q^j_{k1} < QD^{j\,max}_k, \; j \in J, \; k \in QK_j, \quad (c8)$$

$$QX^j_{knhi}, \; Q^j_{k1}, \; QU^j_{kniht}, \; QW^j_{kniht}, \text{ and } QV^j_{kniht} > 0 \text{ and integer for all } j, k, n, i, h, t, \text{ and } G^{jr}_{ht}, S^r_{ht}, \text{ and } O^r_{ht} > 0 \text{ for all } j, r, h, \text{ and } t, \quad (c9)$$

where, in constraint (c3), $$f_{ht}(QX, QU, QW, QV) = \Sigma_{k \in QKj} \Sigma_{n \in Fk} \Sigma_{i \in QIk} a_{kniht} QX^j_{knhi} - \Sigma_{k \in QKj} \Sigma_{n \in Fk} \Sigma_{i \in QT1knh} QU^j_{kniht} - \Sigma_{k \in QKj} \Sigma_{n \in Fk} \Sigma_{i \in QT2knh} (QW^j_{kniht} + QW^j_{knih(t-1)}) - \Sigma_{k \in QKj} \Sigma_{n \in Fk} \Sigma_{i \in QT3knh} QV^j_{kniht} \quad j \in J, \; t \in T_h, \; h=1, \ldots, 7, \quad (c10)$$

where $F_k$ is the set of shift lengths specified for tour k;

J is the set of all skill groups;

R is the set of all contact groups;

$T_h$ is the set of all planning periods in day h;

$OI_k$ is the set of daily start times for tour k;

$QK_j$ is the set of all possible tours including both requiring and not requiring consistent daily start times for scheduling agents in skill group j; when a tour requires consistent daily start times, a pseudo tour is defined for each start time of the tour with the same tour, shift, break, and work and non-work rules, and included in $QI_k$ and $QK_j$;

$QL_k$ is the set of all allowed work day patterns for the agents assigned to tour k; only the work patterns satisfying the work and non-work day rules specified for tour k are included in $QL_k$;

$QB1_{knih}$ is the set of planning periods on day h during which an agent assigned to tour k and shift length n with a daily start time of i may start his/her first relief break and complete within the time window specified for this tour group, shift length, start time, and day;

$QB2_{knih}$ is the set of planning periods on day h during which an agent assigned to tour k and shift length n with a daily start time of i may start his/her lunch break and complete within the time window specified for this tour group, shift length, start time, and day;

$QB3_{knih}$ is the set of planning periods on day h during which an agent assigned to tour k and shift length n with a daily start time of i may start his/her second relief break and complete within the time window specified for this tour group, shift length, start time, and day;

$QT1_{knht}$ is the set of daily start times for shift length n for tour k for which period t on day h is a first relief break start period;

$QT2_{knht}$ is the set of daily start times for shift length n for tour k for which period t on day h is a lunch break start period;

$QT3_{knht}$ is the set of daily start times for shift length n for tour k for which period t on day h is a second relief break start period;

$M^r$ is the set of skill groups that can serve contact type r;

Nj is the set of contact types that skill group j is qualified to provide service;

$a_{kniht}$ is equal to one when period t on day h is in the shift span (that is, a work or a break period) of agents assigned to tour k who have a daily start time of i and shift length n on day h, and zero otherwise;

$A_{k1h}$ is equal to one when day h is a work day for agents assigned to tour k and work pattern 1, and zero otherwise;

$C^j_{k1}$ is the weekly cost of assigning an agent in skill group j to tour k with work pattern of 1;

$c^j_{knhi}$ is the daily wage paid in addition to the weekly cost of $C^j_{k1}$ to agents in skill group j assigned to tour type k with a daily shift length of n and start time of i on day h;

$b^r_{ht}$ is the number of agents with the highest skill proficiency to serve contact type r∈R required in period t on day h;

$P^r_{ht}$ is the per-unit penalty cost for allocating fewer than the number of agents with skill to serve contact type r∈R required $b^r_{ht}$, in period t on day h;

$e^{jr}$ is the relative efficiency of an agent from skill group j in serving contact type r with respect to an agent with the highest skill proficiency (100% efficiency level) for contact type r, $e^{jr} \in [0, 1]$;

$QD^{j\,max}_k$ is the maximum number of agents available in skill group j to assign to tour k;

where decision variables whose values are determined by a solution to the MILP model are defined as:

shift variables:

$QX^j_{knhi}$ is the number of agents in skill group j assigned to tour k and shift length n with a daily starting time of i on day h;

break variables:

$QU^j_{kniht}$ is the number of agents in skill group j assigned to tour k and shift length n with a daily start time of i and starting their first relief breaks in period t on day h;

$QW^j_{kniht}$ is the number of agents in skill group j assigned to tour k and shift length n with a daily start time of i and starting their lunch breaks in period t on day h; when a tour has more than one lunch break to be scheduled during a shift, then a set of break variables and constraints are defined for each lunch break type in the same manner with $QW^j_{kniht}$ variables and constraints (c5), and included in constraint (c3); a lunch break variable may be two or more periods long; a lunch break variable will appear in all periods on the left hand side of (c3) with a negative sign during which the agents assigned to the associate break start time will be on break;

$QV^j_{kniht}$ is the number of agents in skill group j assigned to tour k and shift length n with a daily start time of i and starting their second relief breaks in period t on day h; when a tour has more than two relief breaks to be scheduled during a shift, then a set of break variables and constraints are defined for each break type in the same manner with $QU^j_{knih t}$ and $QV^j_{knih t}$ variables and constraints (c4) and (c6), and included in constraint (c3) A relief break variable may be one or more periods long; a relief break variable will appear in all periods on the left hand side of (c3) with a negative sign during which the agents assigned to that break start time will be on break;

work pattern variables:

$Q^j_{k1}$ is the number of agents in skill group j assigned to tour k with a work pattern of 1;

allocation variables:

$G^{jr}_{ht}$ is the number of agents from skill group j scheduled and not on a break in planning period t on day h, and allocated to contact type r;

shortage variables:

$S^r_{ht}$ is the total agent shortages on the left hand side of constraint (c2) in meeting the required number of agents, $b^r_{ht}$, with skill to serve contact type r∈R in planning period t on day h;

excess variables:

$O^r_{ht}$ is the total overstaffing on the left hand side of constraint (c2) in excess of the required number of agents, $b^r_{ht}$, with skill to serve contact type r∈R in planning period t on day h;

variable sets $QX=\{QX^j_{knhi}: j∈J, n∈F_k, k∈QK_j, i∈I_k, h=1, \ldots, 7\}$ is the set of shift variables $QX^j_{knhi}$;

QU, QW, and QV are defined similar to the set QX to include, respectively, the first relief break, lunch, and second relief break variables (e.g. the set QU includes $QU^j_{kniht}$, QW includes $QW^j_{kniht}$) for skill groups in J, n∈$F_k$, k∈$QK_j$, i∈$I_k$, h=1, \ldots, 7, and t∈$QB1_{knih}$ for QU, t∈$QB2_{knih}$ for QW, and t∈$QB3_{knih}$ for QV; to facilitate the presentation of function (c10), planning period index (t−1) is used; if (t−1) is in one day and planning period t in the next day, planning period and day indexes are adjusted accordingly; for example, if a planning period is 15 minutes long and period 96 is starting period for a lunch break variable on day h, then the second planning period for this variable is not period 97, which is in the next day, but period 1 of day (h+1); likewise if (h+1) is beyond the end of the scheduling period, schedules "wrap around" and agent availabilities appear in the first of the scheduling period; if some tours have four or more break types to be scheduled, one set for each break type is defined in the same manner with QU, QW, and QV; the function $f^r_{ht}$(QX, QU, QW, QV) includes the decision variables for skill group j in QX, and the sets of break variables (e.g. QU, QW, QV) only, and $G=\{G^{jr}_{ht}: j∈J, r∈R, t∈T_h, h=1, \ldots, 7\}$ is the set of variables $G^{jr}_{ht}$;

(d) obtaining the Linear Programming (LP) relaxation of the MILP model in the Branch and Cut (B&C) algorithm by relaxing all integrality constraints on the decision variables, solving the LP relaxation, and stopping the B&C algorithm with an optimal solution to the MILP model when the optimal solution of the LP relaxation satisfies all integrality constraints by a computer;

(e) calling the Rounding Algorithm (RA) consisting of the following steps by a computer when the solution to the LP relaxation of the MILP model violating some integrality constraints is found by the B&C algorithm:

i. Obtaining the values of the decision variables in the optimal solution found for the LP relaxation of the MILP model;

ii. Rounding the fractional values of decision variables in QX, QU, QW, QV, and G down, and weekly tour variables QX, and work pattern variables $Q^j_{k1}$ down when their fractional part is less than or equal to 0.50, and up if greater than 0.50, provided the agent availability constraints on the maximum number of agents available are not violated;

iii. Scheduling additional shifts by increasing the values of decision variable in QX if additional shifts are needed to satisfy the number of work days required by tour scheduling rules for each agent, and to have a shift scheduled for every agent who will be working on a given day based on the work patterns $Q^j_{k1}$ scheduled;

iv. Scheduling additional daily breaks when the number of breaks of each type is not sufficient to satisfy break scheduling rules for a tour for each day, daily shift length and start time, and unscheduling breaks when there are more breaks scheduled than required by a tour for a day, shift length and start time, due to rounding;

v. Computing the left side of constraint (c2) using the values determined in steps (1-iv) for the decision variables, subtracting the right side from the left side of constraint (c2, and determining agent shortages $S^r_{ht}$, when the difference is negative, and excesses $O^r_{ht}$, when the difference is positive, for each contact type and planning period;

vi. Computing scheduled agent availability for all skill groups and planning periods in (c10), comparing them with the agent allocations to different contact types by the rounded values of allocation variables G, and adjusting the values of the associated allocation, G, shortage, $S^r_{ht}$, and excess, $O^r_{ht}$, variables to make agent allocations equal to scheduled agent availability in (c10) and satisfy (c2);

vii. Checking the solution constructed in steps (i) through (vi) to determine if all agent requirements are met in every planning period and, when all requirements are met, eliminating all redundant agent tour schedules that do not create agent shortages in any period when removed by lowering the values of related shift, break, and work pattern variables and stopping with the integer feasible solution found;

viii. Continuing to step (xii) with an integer feasible solution with agent shortages when agent requirements for some contact types are not met in all periods and all available agents in constraint (c8) who can serve these contact types are scheduled;

ix. Continuing to step (x) when there are agents available to schedule when left hand side of (c8) is less than its right hand side for one or more skill groups and there shortages in some periods for some contact types served by these skill groups;

x. finding all periods in which some contact types have shortages, finding an agent with skills needed, from a skill group for which the left side of (c8) is less than its right side, together with a complete tour schedule with work and non-work days, daily shift start times and shift lengths, daily break times to reduce the agent shortages for one or more contact types, and adding them to the solution by increasing the values of the corresponding decision variables by one to include the newly added agent tour schedule, and continuing to step (xii) when all agent requirements are met;

xi. repeating steps (viii), (ix), and (x) until all agent requirements are met, or agent requirements for some contact types are not met in all periods and all available agents in constraint (c8) who can serve these contact types are scheduled;

xii. Examining the tours scheduled in the integer feasible solution found and eliminating redundant tours that do not create new agent shortages in any period when removed by lowering the values of related shift, break, and work pattern variables;

(f) applying the RA algorithm to the solution found for the LP relaxation of the MILP model (current node) by the B&C algorithm when it violates one or more integrality conditions and, when a solution better than the best integer solution known is found by the RA algorithm, passing it to the B&C algorithm by a computer.

2. The method of claim 1 further comprising of repeating steps (e) and (f) for every node the B&C algorithm solves by the computer and finds a solution whose values for decision variables violate one or more integrality constraints, until a terminal solution that is either an optimal integer solution or the best integer solution for the MILP model is reached.

3. The method of claim 1 further comprising of processing the terminal solution found by the computer to assign daily shifts with start times and shift lengths to work patterns, and daily breaks to specific shifts with start times and shift lengths to develop detailed weekly agent schedules.

4. The method of claim 1 further comprising of assigning agents to detailed weekly agent schedules by the computer.

5. The method of claim 1, in which a terminal solution to the MILP model is found when the objective function value for an integer feasible solution differs no more than a pre-specified percentage from the lowest objective function value found for the LP relaxations of all nodes created in the B&C algorithm to which the RA algorithm has not been applied when the integer feasible solution is found.

6. The method of claim 1, in which a terminal solution to the MILP model formulated is found when an integer feasible solution is found and a pre-specified period of time is passed in searching for a better integer feasible solution by the B&C algorithm.

7. The method of claim 1, in which a terminal solution to the MILP model formulated is found when an integer feasible solution is found and a pre-specified number of nodes are solved in the B&C algorithm and evaluated using the RA algorithm.

* * * * *